US012650598B2

(12) United States Patent
DeTone et al.

(10) Patent No.: US 12,650,598 B2
(45) Date of Patent: Jun. 9, 2026

(54) SYSTEMS AND METHODS FOR PERFORMING SELF-IMPROVING VISUAL ODOMETRY

(71) Applicant: Magic Leap, Inc., Plantation, FL (US)

(72) Inventors: Daniel DeTone, San Francisco, CA (US); Tomasz Jan Malisiewicz, Mountain View, CA (US); Andrew Rabinovich, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 245 days.

(21) Appl. No.: 18/417,523

(22) Filed: Jan. 19, 2024

(65) Prior Publication Data

US 2024/0231102 A1     Jul. 11, 2024

Related U.S. Application Data

(63) Continuation of application No. 17/293,772, filed as application No. PCT/US2019/061272 on Nov. 13, 2019, now Pat. No. 11,921,291.

(Continued)

(51) Int. Cl.
*G06V 10/40* (2022.01)
*G02B 27/01* (2006.01)
(Continued)

(52) U.S. Cl.
CPC ........... *G02B 27/0172* (2013.01); *G06N 3/08* (2013.01); *G06T 7/33* (2017.01); *G06T 7/74* (2017.01);
(Continued)

(58) Field of Classification Search
CPC ........ G02B 27/0172; G02B 2027/0138; G02B 2027/014; G02B 2027/0187; G06N 3/08;
(Continued)

(56) References Cited

U.S. PATENT DOCUMENTS

2016/0012311 A1     1/2016  Romanik et al.
2016/0180510 A1     6/2016  Grau
(Continued)

FOREIGN PATENT DOCUMENTS

CN          106708037          5/2017
CN          107924579          4/2018
(Continued)

OTHER PUBLICATIONS

DeTone et al., "Self-improving visual odometry," arXiv preprint, Dec. 8, 2018, arXiv: 1812.03245v1, 9 pages.
(Continued)

*Primary Examiner* — Kathleen M Broughton
(74) *Attorney, Agent, or Firm* — Fish & Richardson P.C.

(57) ABSTRACT

In an example method of training a neural network for performing visual odometry, the neural network receives a plurality of images of an environment, determines, for each image, a respective set of interest points and a respective descriptor, and determines a correspondence between the plurality of images. Determining the correspondence includes determining one or point correspondences between the sets of interest points, and determining a set of candidate interest points based on the one or more point correspondences, each candidate interest point indicating a respective feature in the environment in three-dimensional space). The neural network determines, for each candidate interest point, a respective stability metric and a respective stability metric. The neural network is modified based on the one or more candidate interest points.

14 Claims, 19 Drawing Sheets

Related U.S. Application Data

(60) Provisional application No. 62/913,378, filed on Oct. 10, 2019, provisional application No. 62/767,887, filed on Nov. 15, 2018.

(51) Int. Cl.
| | |
|---|---|
| *G06N 3/08* | (2023.01) |
| *G06T 7/33* | (2017.01) |
| *G06T 7/73* | (2017.01) |

(52) U.S. Cl.
CPC .... *G06V 10/40* (2022.01); *G06T 2207/10016* (2013.01); *G06T 2207/20081* (2013.01); *G06T 2207/20084* (2013.01); *G06T 2207/30244* (2013.01)

(58) Field of Classification Search
CPC ...... G06N 3/0464; G06N 3/0895; G06T 7/33; G06T 7/74; G06T 2207/10016; G06T 2207/20081; G06T 2207/20084; G06T 2207/30244; G06V 10/40; G06F 3/011; G06F 3/012
See application file for complete search history.

(56) References Cited

U.S. PATENT DOCUMENTS

| | | | |
|---|---|---|---|
| 2016/0196659 | A1 | 7/2016 | Vrcelj et al. |
| 2018/0012411 | A1 | 1/2018 | Richey et al. |
| 2018/0039745 | A1 | 2/2018 | Chevalier et al. |
| 2018/0053056 | A1 | 2/2018 | Rabinovich et al. |
| 2018/0129907 | A1 | 5/2018 | Saklatvala |
| 2018/0211401 | A1 | 7/2018 | Lee et al. |
| 2018/0268256 | A1 | 9/2018 | Di Febbo et al. |
| 2018/0293738 | A1 | 10/2018 | Yang et al. |
| 2019/0026956 | A1* | 1/2019 | Gausebeck ............. G06T 7/593 |
| 2021/0174539 | A1* | 6/2021 | Duong ..................... G06T 7/74 |
| 2022/0028110 | A1* | 1/2022 | Detone ................ G06N 3/0464 |

FOREIGN PATENT DOCUMENTS

| | | | |
|---|---|---|---|
| CN | 107958460 | A | 4/2018 |
| WO | WO 2017/143239 | | 8/2017 |
| WO | WO 2017/168899 | | 10/2017 |
| WO | WO 2018/125812 | | 7/2018 |
| WO | WO 2018/138782 | | 8/2018 |

OTHER PUBLICATIONS

Office Action in European Appln. No. 19885433.3, dated Sep. 17, 2024, 7 pages.
Cieslewski et al., "SIPS: Unsupervised Succinct Interest Points," cs.CV, Computer Vision and Pattern Recognition, Submitted on May 3, 2018, arXiv:1805.01358v1, 23 pages.
Cieslewski et al., "SIPS: unsupervised succinct interest points," Paper, Presented at Proceedings of the 2019 IEEE International Conference on 3D Vision (3DV), Quebec City, Canada, Sep. 16-19, 2019, 23 pages.
DeTone et al., "SuperPoint: Self-Supervised Interest Point Detection and Description," Paper, Presented at Proceedings of the 2018 IEEE/CVF Conference on Computer Vision and Pattern Recognition Workshops (CVPRW), Salt Lake City, UT, Jun. 18-22, 2018, pp. 337-349.
DeTone et al., "Toward Geometric Deep SLAM," cs.CV, Computer Vision and Pattern Recognition, Submitted Jul. 24, 2017, arXiv:1707.07410v1, 14 pages.
Extended European Search Report in European Appln. No. 19885433.3, dated Jul. 29, 2022, 12 pages.
Han et al., "A Cnn based framework for stable image feature selection," Paper, Presented at Proceedings of the 2017 IEEE Global Conference on Signal and Information Processing, Montreal, QC, Canada, Nov. 14-16, 2017, 6 pages.
Office Action in Chinese Appln. No. 201980087289.6, dated Dec. 12, 2023, 18 pages (with English translation).
Office Action in Japanese Appln. No. 2021-526271, dated Aug. 16, 2023, 6 pages (with English translation).
PCT International Search Report and Written Opinion in International Appln. No. PCT/US2019/061272, dated Feb. 6, 2020, 12 pages.
Sarlin et al., "SuperGlue: Learning Feature Matching with Graph Neural Networks," cs.CV, Submitted on Nov. 26, 2019, arXiv:1911.11763v1, 17 pages.
Weerasekera et al., "Learning deeply supervised good features to match for dense monocular reconstruction," Paper, Presented at Proceedings of the 14th Asian Conference on Computer Vision, Perth, Australia, Dec. 2-6, 2018, 26 pages.
Zhou et al., "Paper: Unsupervised learning of depth and ego-motion from video," Paper, Presented at Proceedings of the IEEE Conference on Computer Vision and Pattern Recognition, Honolulu, HI, Jul. 21-26, 2017, 10 pages.
Notice of Allowance in Chinese Appln. No. 201980087289.6, dated Apr. 21, 2024, 6 pages (with English translation).

* cited by examiner

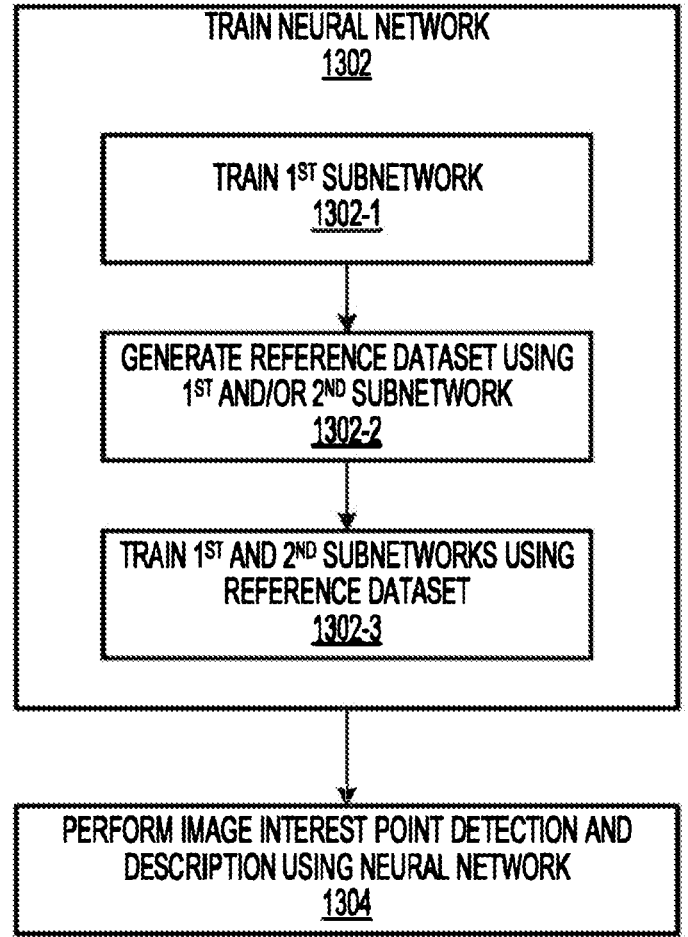
TRAIN NEURAL NETWORK
1302
TRAIN 1ST SUBNETWORK
1302-1
GENERATE REFERENCE DATASET USING
1ST AND/OR 2ND SUBNETWORK
1302-2
TRAIN 1ST AND 2ND SUBNETWORKS USING
REFERENCE DATASET
1302-3
PERFORM IMAGE INTEREST POINT DETECTION AND
DESCRIPTION USING NEURAL NETWORK
1304
1300
FIG. 13

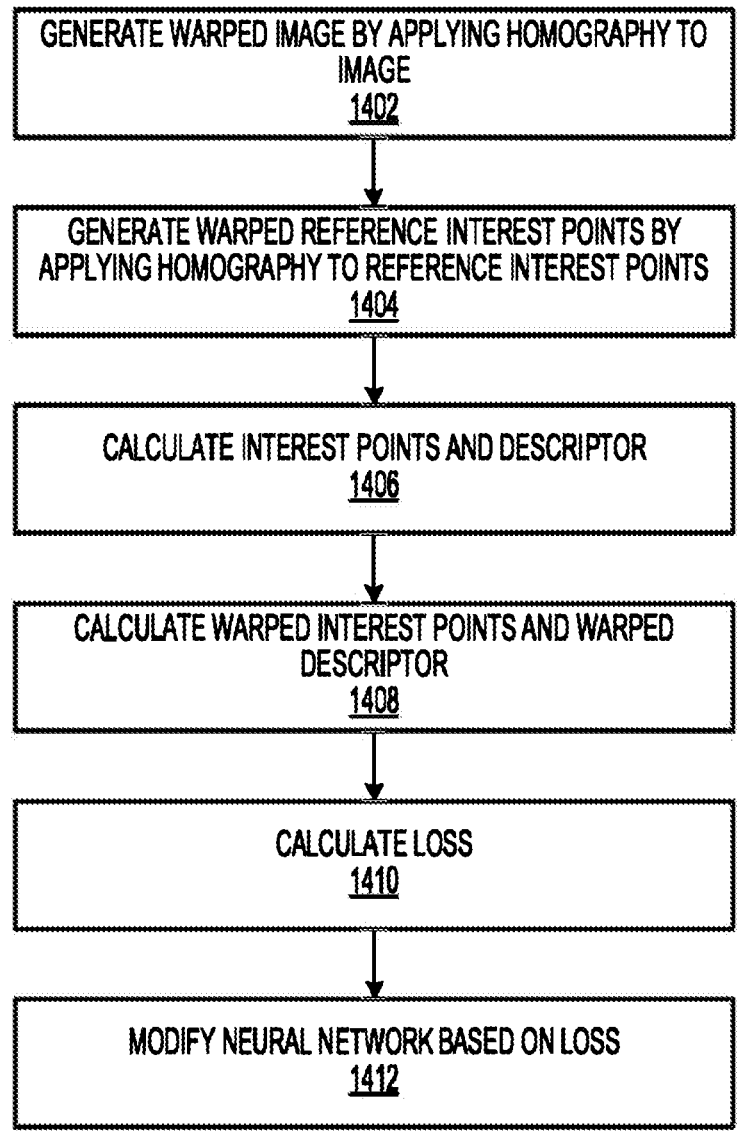
GENERATE WARPED IMAGE BY APPLYING HOMOGRAPHY TO IMAGE
1402
GENERATE WARPED REFERENCE INTEREST POINTS BY APPLYING HOMOGRAPHY TO REFERENCE INTEREST POINTS
1404
CALCULATE INTEREST POINTS AND DESCRIPTOR
1406
CALCULATE WARPED INTEREST POINTS AND WARPED DESCRIPTOR
1408
CALCULATE LOSS
1410
MODIFY NEURAL NETWORK BASED ON LOSS
1412
1400
FIG. 14

1500

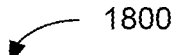

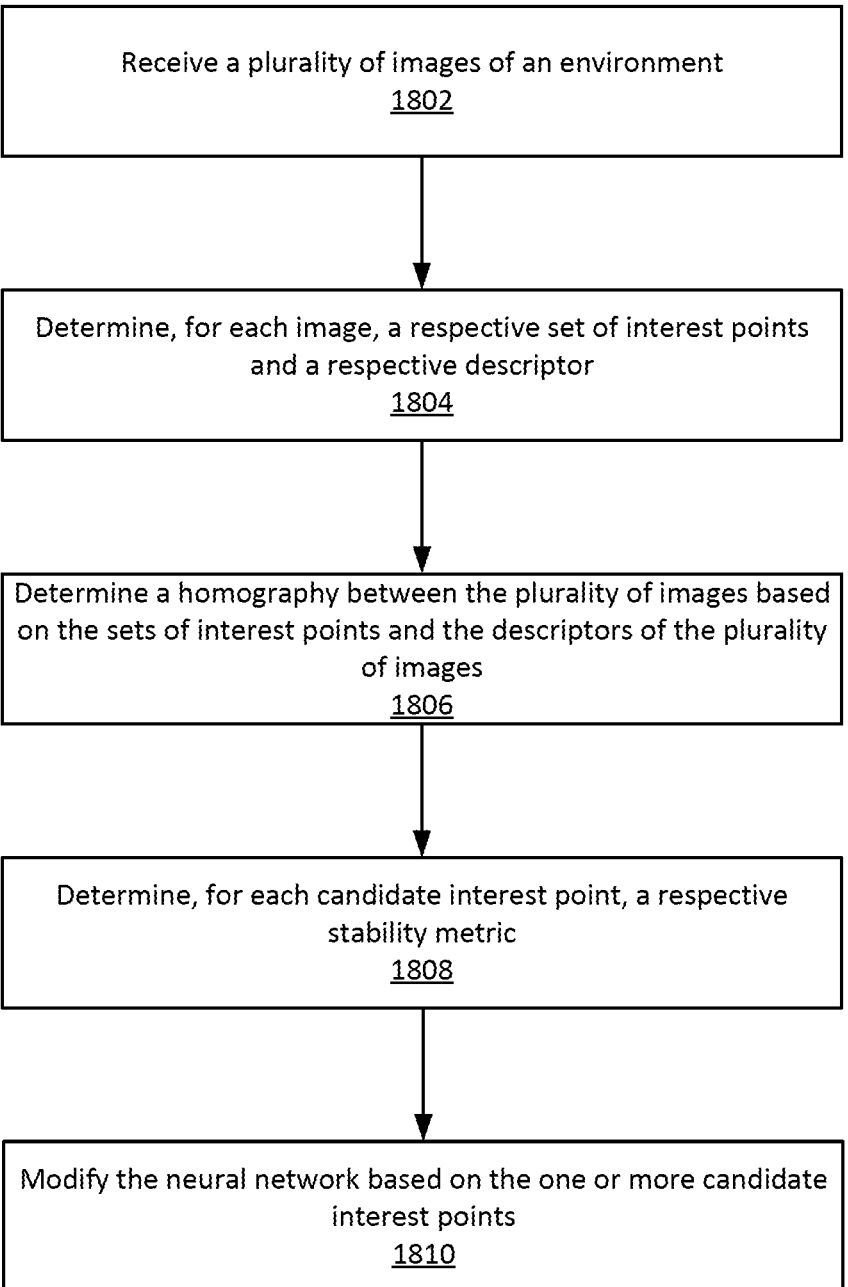

Receive a plurality of images of an environment
1802

Determine, for each image, a respective set of interest points and a respective descriptor
1804

Determine a homography between the plurality of images based on the sets of interest points and the descriptors of the plurality of images
1806

Determine, for each candidate interest point, a respective stability metric
1808

Modify the neural network based on the one or more candidate interest points
1810

1910 — PROCESSOR(S)

1925 — STORAGE DEVICE(S)

1915 — INPUT DEVICE(S)

1920 — OUTPUT DEVICE(S)

1919 — COMMUNICATIONS SUBSYSTEM

WORKING MEMORY

OPERATING SYSTEM

1940

1945

1935

APPLICATION(S)

1900

SYSTEMS AND METHODS FOR PERFORMING SELF-IMPROVING VISUAL ODOMETRY

CROSS-REFERENCE TO RELATED APPLICATIONS

This application is a continuation of U.S. patent application Ser. No. 17/293,772 titled "SYSTEMS AND METH-ODS FOR PERFORMING SELF-IMPROVING VISUAL ODOMETRY" and filed on Mar. 13, 2021, which is a U.S. National Stage Application under 35 U.S.C. § 371 and claims the benefit of International Patent Application No. PCT/US2019/061272 titled "SYSTEMS AND METHODS FOR PERFORMING SELF-IMPROVING VISUAL ODOMETRY" and filed on Nov. 13, 2019, which claims the benefit of U.S. Provisional Patent Application No. 62/913,378 titled "SELF-IMPROVING VISUAL ODOMETRY" and filed on Oct. 10, 2019, and also claims the benefit of U.S. Provisional Patent Application No. 62/767,887 titled "SELF-IMPROVING VISUAL ODOMETRY" and filed on Nov. 15, 2018, which are incorporated herein by reference in their entirety.

TECHNICAL FIELD

This disclosure relates to training neural networks for performing visual odometry.

BACKGROUND

Visual odometry is the process of determining the position and orientation of a device (e.g., a head-mounted display device) based on an analysis of camera images (e.g., camera images obtained from the perspective of the device). In some implementations, visual odometry is performed, at least in part, by identifying interest points in one or more images, determining a relationship between the interest points, and determining the position and orientation of a device based on that relationship.

SUMMARY

The present disclosure relates generally to visual odometry. More particularly, embodiments of the present disclosure provide systems, devices, and methods for detecting and describing interest points in one or more images using a neural network, and performing visual odometry based on those interest points. Although portions of the present disclosure are described in reference to an augmented reality (AR) device, the disclosure is applicable to a variety of applications in computer vision and image display systems.

In an aspect, a method is performed to train a neural network for performing visual odometry. The method includes receiving, by the neural network implemented using one or more computer systems, a plurality of images of an environment. The method also includes determining, by the neural network, for each image, a respective set of interest points and a respective descriptor. The method also includes determining, by the neural network, a correspon-dence between the plurality of images based on the sets of interest points and the descriptors of the plurality of images. Determining the correspondence between the plurality of images includes determining one or point correspondences between the sets of interest points. Each point correspon-dence indicates a respective correspondence between an interest point of one image and an interest point of another image, determining the correspondence between the plural-ity of images also includes determining, based on the one or more point correspondences, a set of candidate interest points. Each candidate interest point indicates a respective feature in the environment in three-dimensional space. The method also includes determining, for each candidate inter-est point, a respective stability metric, and modifying the neural network based on the one or more candidate interest points.

Embodiments of this aspect can include one or more of the following features.

In some embodiments, determining, for each candidate interest point, the respective stability metric includes deter-mining that a first candidate interest point is stable.

In some embodiments modifying the neural network based on one or more of the candidate interest points includes, responsive to determining that the first candidate interest point is stable, selecting the first candidate interest point and a first pair of images from among the plurality of images to train the neural network. The first pair of images depicts the first candidate interest point in the environment.

In some embodiments, determining that the first candidate interest point is stable includes determining that the first candidate interest point is depicted in a number of images of the plurality of images exceeding a first threshold number, and determining that a re-projection error associated with the first candidate interest point is less than a first threshold error level.

In some embodiments, determining, for each candidate interest point, the respective stability metric includes deter-mining that a second candidate interest point is unstable.

In some embodiments, modifying the neural network based on one or more of the candidate interest points includes, responsive to determining that the second candi-date interest point is unstable, selecting the second candidate interest point and second pair of images from among the plurality of images to train the neural network. The second pair of images depicts the second candidate interest point in the environment.

In some embodiments, determining that the second can-didate interest point is unstable includes determining that the second candidate interest point is depicted in a number of images of the plurality of images exceeding a second threshold number, and determining that a re-projection error associated with the second candidate interest point is greater than a second threshold error level.

In some embodiments, the first threshold number is equal to the second threshold number.

In some embodiments, the first threshold error level is less than the second threshold error level.

In some embodiments, determining, for each candidate interest point, the respective stability metric includes deter-mining that a third candidate interest point is to be omitted from the training of the neural network.

In some embodiments, determining that the third candi-date interest point is to be omitted from the training the neural network includes determining that at least one of: (i) the third candidate interest point is depicted in a number of images of the plurality of images less than a third threshold number, or (ii) determining that a re-projection error asso-ciated with the third candidate interest point is between the first threshold error level and the second threshold error level.

In some embodiments, the third threshold number is equal to the first threshold number.

In some embodiments, the plurality of images include two-dimensional images extracted from a video sequence.

In some embodiments, the plurality of images correspond to non-contiguous frames of the video sequence.

In some embodiments, the method further includes, subsequent to modifying the neural network, receiving, by the neural network, a second plurality of images of a second environment from a head-mounted display device. The method also includes identifying, by the neural network, a second set of interest points, and performing, by the neural network, visual odometry with respect to the second environment based on the second plurality of images and the second set of interest points.

In some embodiments, performing visual odometry with respect to the second environment includes determining a position and orientation of the head-mounted display device using the second set of interest points as landmarks.

Other embodiments are directed to systems, apparatus, and non-transitory, computer-readable mediums for facilitating the performance of some or all of the aforementioned method.

Embodiments of the present disclosure can provide a variety of technical benefits. For example, at least some embodiments provide a self-supervised framework for training interest point detectors and descriptors to facilitate the performance of visual odometry. Embodiments of the present disclosure can be used to analyze a wide array of single or multi-channel two-dimensional (2D) images (e.g., internet RGB photos, tiny robotics grayscale cameras, underwater images, aerial images, telescope imagery, depth sensor images, thermal camera images, etc.), and can be used to solve a variety of multiple-view geometry problems without substantial human intervention. Further, at least some embodiments provide fully-convolutional models operating on full sized images that jointly compute pixel-level interest point locations and associated descriptors in one forward pass. Further, at least some embodiments may be described as homographic adaptation: a multi-scale, multi-homography approach for boosting interest point detection accuracy and performing cross-domain adaptation (e.g., synthetic to real). Further, at least some embodiments enable the detection of richer interest points, with greater point matching accuracy and more accurate homography estimation (e.g., compared to traditional corner detectors, traditional descriptors, and/or pre-adapted deep models). Furthermore, at least some embodiments do not require explicit geometric correspondence information, and thus can be deployed in a wide variety of environments and use cases. Other benefits will be readily apparent to those skilled in the art.

The details of one or more embodiments are set forth in the accompanying drawings and the description below. Other features and advantages will be apparent from the description and drawings, and from the claims.

DESCRIPTION OF DRAWINGS

FIG. 13 illustrates a method of training a neural network and performing image interest point detection and description using the neural network.

FIG. 14 illustrates a method of training a neural network for image interest point detection and description.

FIG. 18 illustrates a method for training a neural network for performing visual odometry.

DETAILED DESCRIPTION

Figure 1:
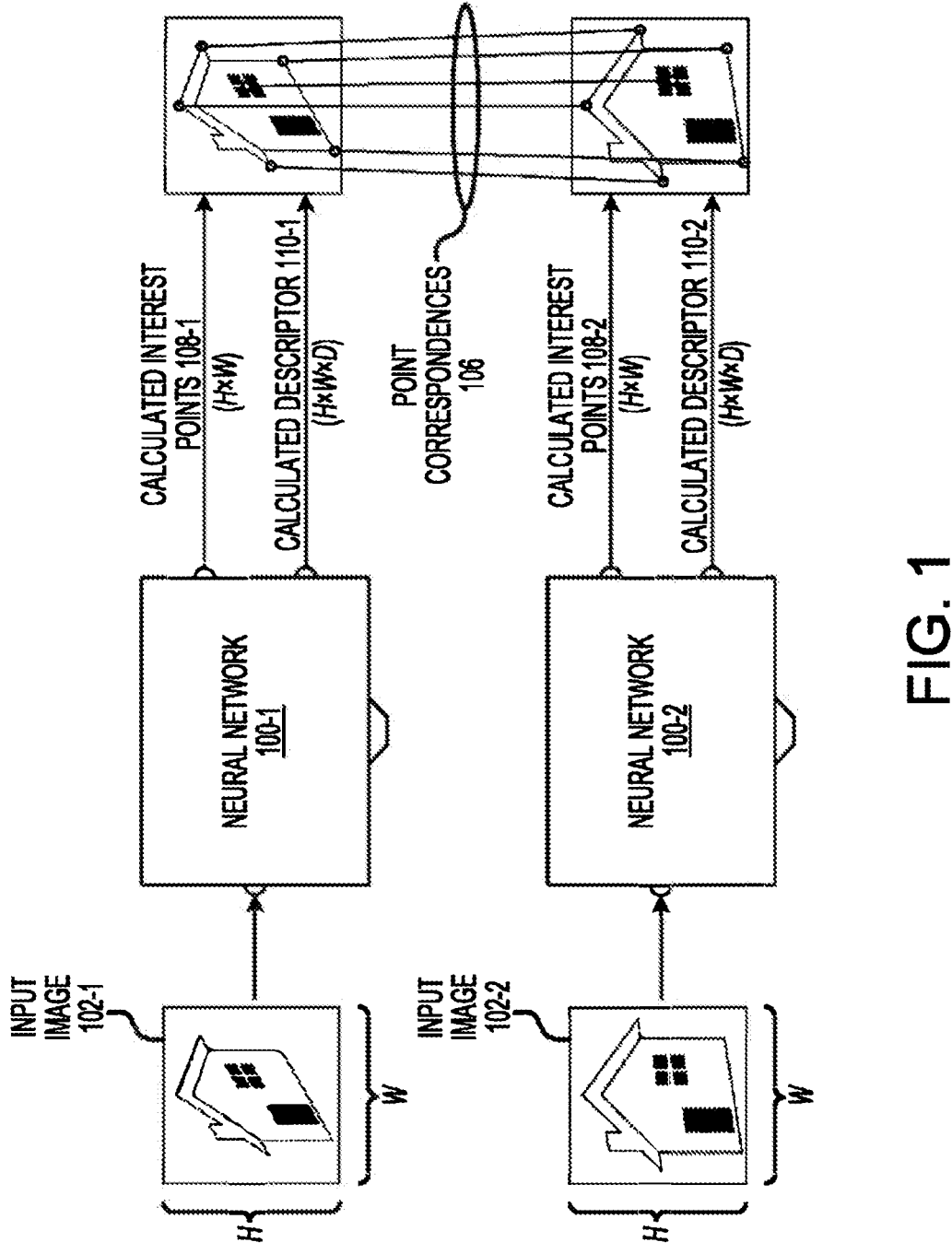
FIG. 1 illustrates a determination of point correspondences between interest points of a pair of input images using a neural network.

Convolutional neural networks have been shown to be superior to hand-engineered representations on almost all tasks requiring images as input. In particular, fully convolutional neural networks which predict two-dimensional (2D) "key-points" or "landmarks" are well studied for a variety of tasks such as human pose estimation, object detection, and room layout estimation. Some of these techniques utilize a large dataset of 2D ground truth locations labeled with human annotations. It seems natural to similarly formulate interest point detection as a large-scale supervised machine learning problem and train the latest convolutional neural network architecture to detect them. Unfortunately, when compared to more semantic tasks such as human-body key-point estimation, where a network is trained to detect semantic body parts such as the corner of the mouth or left ankle, the notion of interest point detection is semantically ill-defined. This difficulty makes training convolution neural networks with strong supervision of interest points non-trivial.

Instead of using human supervision to define interest points in real images, at least some of the embodiments described herein offer a self-supervised solution using self-training. In the approaches of the embodiments described herein, a large dataset of pseudo-ground truth interest point locations in real images is created, supervised by the interest point detector itself rather than human knowledge. To generate the pseudo-ground truth interest points, a fully convolutional neural network is first trained on millions of unique examples from a synthetic image dataset. As feature extraction is a basic step for image matching and tracking in image sequences, it was acknowledged that detection and precise location of distinct points may be important. These distinct points were characterized as corners, edges (basic elements for the analysis of poly-hedra), and centers of circular features, such as holes, disk, or rings. Junctions (Y, X, T, L) were also deemed critical for detecting such distinct points.

For example, T-junctions generically indicate interposition and hence depth discontinuities.

Borrowing from these insights, a large dataset of synthetic shapes for large-scale training of the interest point detector may be created consisting of simple geometric shapes where there is no ambiguity in the interest point locations. The interest point detector as described herein was shown to significantly outperform traditional interest point detectors on the dataset of synthetic shapes. When applied to real images, the interest point detector performs well considering that domain adaptation is a known problem when training on synthetic images. However, when compared to classical interest point detectors on a diverse set of image textures and patterns, the performance of the interest point detector is not so consistent. To bridge the gap in performance on real world images between the interest point detector and classical detectors, at least some of the embodiments described herein (alternatively referred to herein as homographic adaptation) permit multi-scale, multitransforms.

Homographic adaptation enables self-supervised training of interest point detectors. In some embodiments, it warps the input image multiple times to help an interest point detector see the scene from many different viewpoints and scales. When used in conjunction with the interest point detector to generate the pseudo-ground truth interest points and boost the performance of the detector, the resulting detections are more repeatable. One step after detecting robust and repeatable interest points is to attach a fixed dimensional descriptor vector to each point (or to all image pixels), which can be used for matching interest points across images. Therefore, in at least some of the embodiments described herein, the interest point detector subnetwork may be combined with a descriptor subnetwork. The resulting network can be used to extracts points from a pair of images and establish point correspondences, as shown in FIG. 1.

According to at least some of the embodiments described herein, which includes a self-supervised approach, an initial interest point detector and a homographic adaptation procedure automatically labels images from a target, unlabeled domain. The generated labels are in turn used to train a fully convolutional network that jointly extracts points and descriptors from an image. The fully convolutional network can be used in a wide range of applications, particularly those involving image-to-image geometry tasks such as computing a homography between two images. Homographies give exact, or almost exact, image-to-image transformations for camera motion with only rotation around the camera center, scenes with large distances to objects, and planar scenes. Because most of the world is reasonably planar, a homography is good model for what happens when the same three-dimensional (3D) point is seen from different viewpoints. Because homographies do not require 3D information, they can be randomly sampled and easily applied to any 2D image involving little more than bilinear interpolation. For these reasons, homographies are utilized in at least some of the embodiments described herein.

FIG. 1 illustrates the determination of point correspondences 106 between the interest points of a pair of input images 102 using a neural network 100. Specifically, FIG. 1 shows two instantiations of neural network 100 (i.e., neural networks 100-1, 100-2) that is a fully convolutional neural network that computes scale invariant feature transform (SIFT)-like 2D interest point locations and descriptors in a single forward pass utilizing point correspondence. When receiving input images 102-1, 102-2 as input, neural networks 100-1, 100-2 calculate sets of calculated interest points 108-1, 108-2 and calculated descriptors 110-1, 110-2 based on input images 102-1, 102-2, respectively. Point correspondences 106 are then determined by a comparison between calculated interest points 108-1, 108-2, which is informed by the descriptors associated with each of the interest points. For example, descriptors associated with different interest points may be matched. The interest points corresponding to different images having the most similar descriptors may be determined to correspond to each other, according to one of several possible similarity scoring procedures.

According to one example, a first interest point corresponding to input image 102-1 may be determined to correspond to a second interest point corresponding to input image 102-2 by determining that, amongst the five closest interest points (according to pixel-to-pixel distance) to the first interest point, the descriptor associated with the second interest point is most similar (determined by, for example, using the L2 distance) to the descriptor associated with the first interest point, as compared to the descriptors associated with the five closest interest points. According to another example, a first interest point corresponding to input image 102-1 may be determined to correspond to a second interest point corresponding to input image 102-2 by determining that, amongst all interest points corresponding to input image 102-2, the descriptor associated with the second interest point is most similar to the descriptor associated with the first interest point, as compared to the descriptors associated with all interest points corresponding to input image 102-2.

Figure 2:
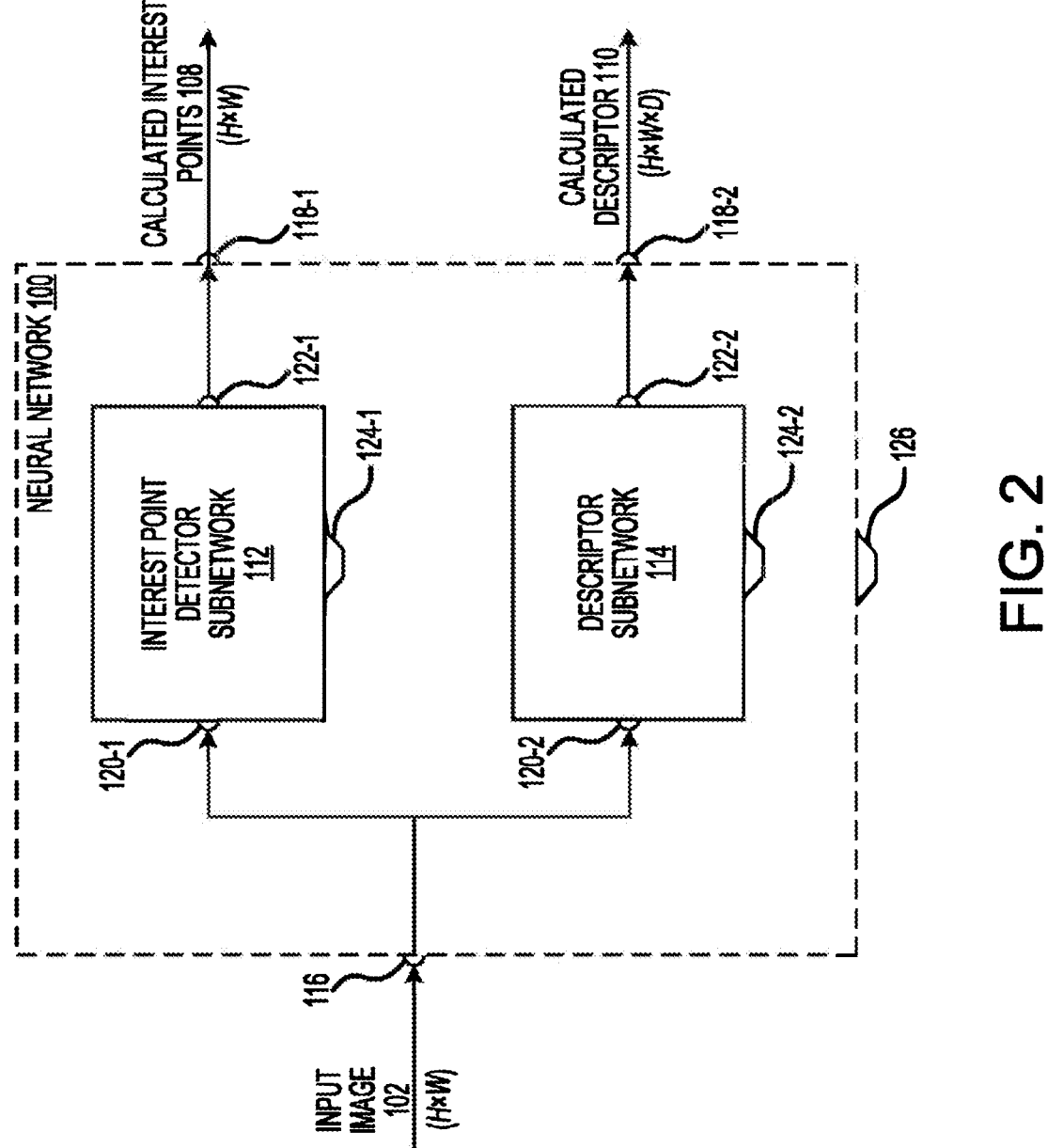
FIG. 2 illustrates a general architecture of a neural network.

FIG. 2 illustrates a general architecture of neural network 100. Neural network 100 may include an interest point detector subnetwork 112 and a descriptor subnetwork 114, each of the two subnetworks having a single subnetwork input 120-1, 120-2 (respectively) and a single subnetwork output 122-1, 122-2 (respectively). Although the two subnetworks are illustrated separately, they may share one or more convolutional layers and/or neurons as described in reference to FIG. 9. In some embodiments, neural network 100 may include a network input 116 configured to receive input image 102 as input. Input image 102 may then be fed to subnetwork inputs 120-1, 120-2. Upon receiving input image 102 at subnetwork input 120-1, interest point detector subnetwork 112 may calculate and output calculated interest points 108 at subnetwork output 122-1, which is then fed into network output 118-1. Upon receiving input image 102 at subnetwork input 120-2, descriptor subnetwork 114 may calculate and output calculated descriptor 110 at subnetwork output 122-2, which is then fed into network output 118-2. Accordingly, subnetworks 112, 114 can provide different outputs based on the same input, and represent different branches of neural network 100.

Neural network 100 may operate on a full-sized image and may produce interest point detections accompanied by fixed length descriptors in a single forward pass. In some embodiments, input image 102 may have a dimensionality of H×W where H is the height of input image 102 in pixels and W is the width of input image 102 in pixels. In the same embodiments, calculated interest points 108 may be a list of interest point pixel locations (e.g., a list of coordinate pairs) or, additionally or alternatively, calculated interest points 108 may be a 2D map having a dimensionality of H×W where each pixel corresponds to a probability "point" for that pixel in the input (i.e., input image 102). In the same embodiments, calculated descriptor 110 may be a set of fixed length descriptors, each of which corresponds to an identified interest point or, additionally or alternatively, calculated descriptor 110 may have a dimensionality of H×W×D where D is the length of the descriptors calculated at each pixel of the H×W image. Accordingly, even pixels having a low probability of containing an interest point have a descriptor of length D.

Training of neural network 100 may be enabled by network modifier 126 and/or subnetwork modifiers 124-1, 124-2, which may receive an error signal, a loss signal, and/or a correction signal during a training phase causing layers and/or neurons of the networks to be modified. Neural network 100 may be modified such that an error between the network outputs (calculated interest points 108 and calculated descriptor 110) and ground truth data may be reduced during subsequent runs with the same input image 102 or different images. For example, neural network 100 may be modified based on an error signal/value that indicates a difference between an output and ground truth, based on a loss signal/value that indicates some quantity that is to be minimized, and/or based on a correction signal that indicates a specific modification to be made to neural network 100. Modifying neural network 100 may include modifying only interest point detector subnetwork 112, modifying only descriptor subnetwork 114, and/or modifying both of subnetworks 112, 114.

Figure 3:
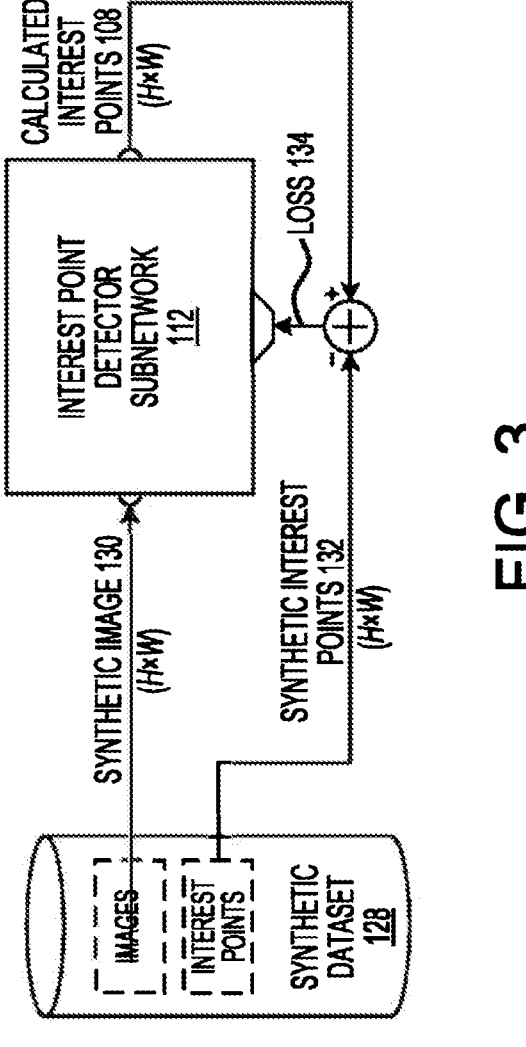
FIG. 3 illustrates a first training step in which an interest point detector subnetwork is trained using a synthetic dataset including one or more synthetic images.

FIG. 3 illustrates a first training step in which interest point detector subnetwork 112 is trained using a synthetic dataset 128 including one or more synthetic images. The training step illustrated in FIG. 3 may only include interest point detector subnetwork 112 and may ignore descriptor subnetwork 114. Because there is no pre-existing large database of interest point labeled images, a deep interest point detector benefits from the creation of a large-scale synthetic dataset that consists of simplified 2D geometry via synthetic data rendering of quadrilaterals, triangles, lines and ellipses. Examples of these shapes are shown in reference to FIG. 7. In this dataset, label ambiguity can be removed by modeling interest points with simple Y-junctions, L-junctions, T-junctions as well as centers of tiny ellipses and end points of line segments.

Once the synthetic images are rendered, homographic warps are applied to each image to augment the number of training examples. The data may be generated in real time and no example may be seen by the network twice. During a single training iteration, a synthetic image 130 is provided to interest point detector subnetwork 112, which calculates a set of calculated interest points 108. A set of synthetic interest points 132 corresponding to synthetic image 130 are compared to calculated interest points 108 and a loss 134 is calculated based on the comparison. Interest point detector subnetwork 112 is then modified based on loss 134. Multiple training iterations are performed until one or more conditions are met, such as loss 134 dropping below a predetermined threshold and/or synthetic dataset 128 being exhaustively used.

Compared to other traditional corner detection approaches such as FAST, Harris corners, and Shi-Tomasi's "Good Features To Track," interest point detector subnetwork 112 produces superior results on synthetic dataset 128. Further evaluation of interest point detector subnetwork consisted of using simple synthetic geometry that a human could easily label with the ground truth corner locations. In one performance evaluation, two different models of interest point detector subnetwork 112 were used. Both models shared the same encoder architecture but differed in the number of neurons per layer, the first model having 64-64-64-64-128-128-128-128-128 neurons per layer and the second model having 9-9-16-16-32-32-32-32-32 neurons per layer. Each detector was given an evaluation dataset with synthetic dataset 128 to determine how well they localized simple corners. An evaluation demonstrated that interest point detector subnetwork 112 outperformed the classical detectors in all categories, with the classical detectors having difficulty with random inputs in particular.

Figure 4:
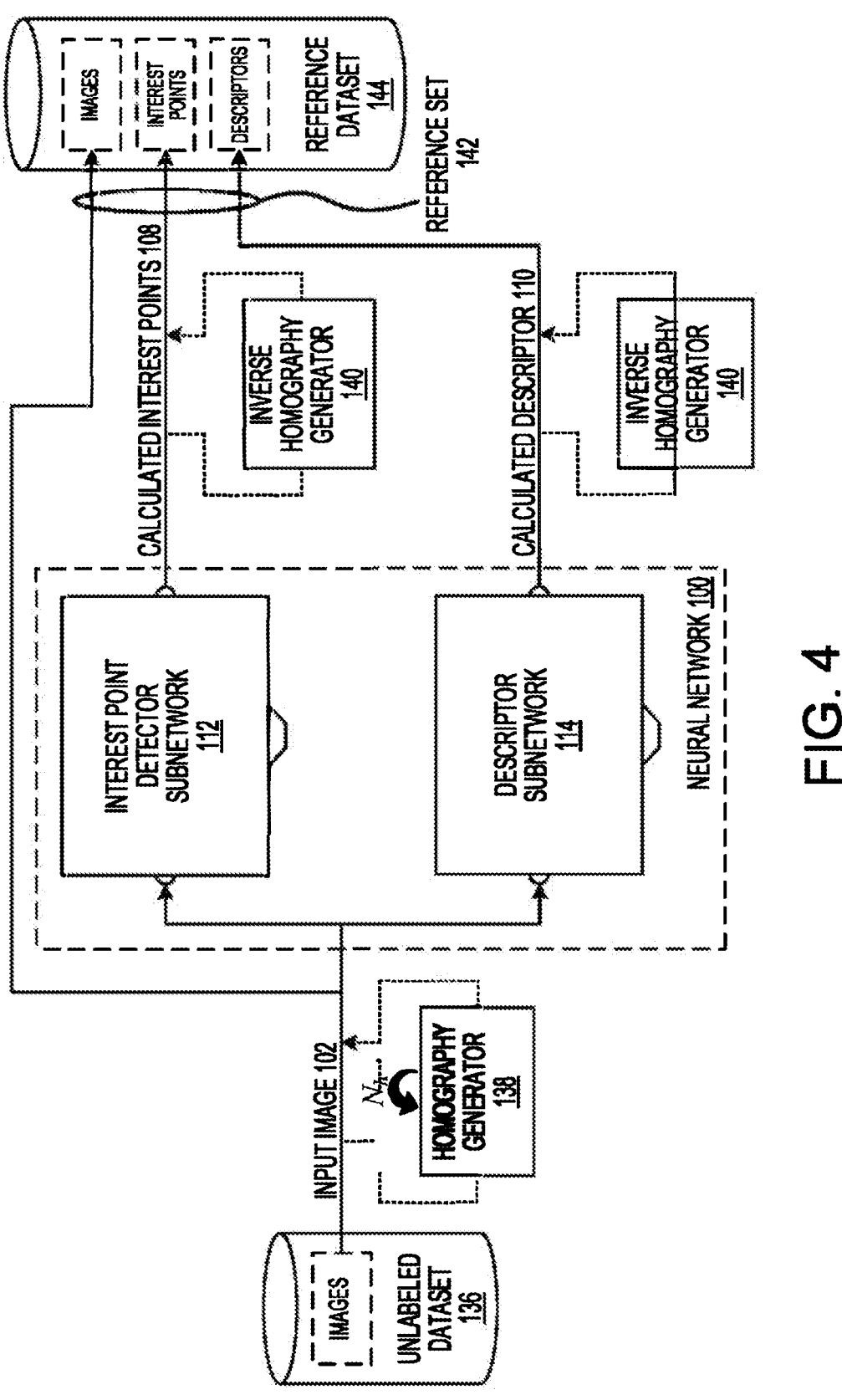
FIG. 4 illustrates a second training step in which a reference dataset is compiled using homographic adaptation.

FIG. 4 illustrates a second training step in which a reference dataset 144 is compiled using homographic adaptation. Reference dataset 144 represents a pseudo-ground truth dataset that includes images taken from an unlabeled dataset 136 including, for example, real world images, as well as reference interest points and reference descriptors. Input image 102 is taken from unlabeled dataset 136 and is provided to neural network 100, which calculates a set of calculated interest points 108 and a calculated descriptor 110 based on input image 102. Data may be stored in reference dataset 144 as a reference set 142, each reference set 142 including input image 102, the calculated interest point 108 corresponding to input image 102, and the calculated descriptor 110 corresponding to input image 102.

During a single training iteration, homographic adaptation may be employed to use the average response across a large number of homographic warps of input image 102. A homography generator 138 may be used to apply one or more random or pseudo-random homographies to input image 102 prior to passing the image through neural network 100. On the other side of neural network 100, an inverse homography generator 140 may be used to apply one or more inverse homographies to calculated interest points 108, the one or more inverse homographies being the inverse of the one or more homographies so as to unwarp calculated interest points 108. The process may repeated, for the same input image 102, to obtain one or more unwarped calculated interest points. The one or more unwarped calculated interest points may be aggregated/combined to obtain the set of reference interest points that is stored in reference dataset 144 along with input image 102 and the reference descriptor as part of reference set 142.

Additionally or alternatively, homographic adaptation may be employed to improve the descriptors outputted by neural network 100. For example, during a single training iteration, homography generator 138 may be used to apply one or more random or pseudo-random homographies to input image 102 prior to passing the image through neural network 100. On the other side of neural network 100, an inverse homography generator 140 may be used to apply one or more inverse homographies to calculated descriptor 110, the one or more inverse homographies being the inverse of the one or more homographies so as to unwarp calculated descriptor 110. The process may repeated, for the same input image 102, to obtain one or more unwarped calculated descriptors. The one or more unwarped calculated descriptors may be aggregated/combined to obtain the reference descriptor that is stored in reference dataset 144 along with input image 102 and the set of reference interest points as part of reference set 142.

The number of homographic warps $N_h$ is a hyper-parameter of this approach. In some embodiments, the first homography is set be equal to identity, so that $N_h=1$ (meaning no adaptation). In testing, the range of $N_h$ was varied to try and determine a preferred value, with $N_h$ in some embodiments running from small ($N_h=10$), to medium ($N_h=100$), and large ($N_h=1000$). Results suggest there are diminishing returns when performing more than 100 homographies. On a held-out set of images from MS-COCO, a repeatability score of 0.67 without any homographic adaptation was met, a repeatability boost of 21% when performing $N_h=100$ transforms, and a repeatability boost of 22% when $N_h=1000$ sufficiently demonstrated minimal benefit of using more than 100 homographies.

When combining interest point response maps or descriptor maps, it may be beneficial to differentiate between within-scale aggregation and across-scale aggregation. Real-world images typically contain features at different scales, as some points which would be deemed interesting in a high resolution images, are often not even visible in coarser, lower resolution images. However, within a single-scale, transformations of the image such as rotations and translations should not make interest points appear/disappear. This underlying multi-scale nature of images has different implications for within-scale and across-scale aggregation strategies. Within scale aggregation should be similar to computing the intersection of a set and across-scale aggregation should be similar to the union of a set. The average response across scale can also be used as a multi-scale measure of interest point confidence. The average response across scales are maximized when the interest point is visible across all scales, and these are likely to be the most robust interest points for tracking applications.

When aggregating across scales, the number of scales considered $N_s$ is a hyper-parameter of the approach. The setting of $N_s=1$ corresponds to no multi-scale aggregation (or simply aggregating across the large possible image size only). In some embodiments, for $N_s>1$, the multi-scale set of images being processed are referred to as the multi-scale image pyramid." Weighting schemes that weigh levels of the pyramid differently may give higher-resolution images a larger weight. This may be important because interest points detected at lower resolutions have poor localization ability, and final aggregated points should be localized as well. Experimental results demonstrated that within-scale aggregation has the biggest effect on repeatability. In some embodiments, the homographic adaptation technique is applied at training time to improve the generalization ability of subnetworks 112, 114 and network 100 on real images.

Theoretical support for the homographic adaptation approach is described in the following paragraphs. In some embodiments, an initial interest point function is represented by $f_\theta(\cdot)$, I the input image, x the resultant points, and H a random homography, such that:

$$x = f_\theta(I) \qquad \text{Eq. 1}$$

An ideal interest point operator should be covariant with respect to homographies. A function $f_\theta(\cdot)$ is covariant with H if the output transforms with the input. In other words, a covariant detector will satisfy, for all $$Hx = f_\theta(H(I)) \qquad \text{Eq. 2}$$

For clarity, the notation Hx denotes the homography matrix H being applied to the resulting interest points, and H(I) denotes the entire image I being warped by homography matrix H. Moving the homography related terms to the right produces:

$$x = H^{-1}f_\theta(H(I)) \qquad \text{Eq. 3}$$

In practice, an interest point detector will not be perfectly covariant, and different homographies in the previous equation will result in different interest points x. In some embodiments, this is addressed by performing an empirical sum over a sufficiently large sample of random H's. The resulting aggregation over samples yields a superior interest point detector F($\cdot$), defined as follows:

$$\hat{F}(I; f_\theta) = \frac{1}{N_h}\sum_{i=1}^{N_h}H_i^{-1}f_\theta(H_i(I)) \qquad \text{Eq. 4}$$

In some embodiments, not all matrices produce good results, not for lack of technical capability, but as not all possible random homographies represent plausible camera transformations. In some embodiments, potential homographies are decomposed into more simple, less expressive transformation classes by sampling within pre-determined ranges for translation, scale, in-plane rotation, and symmetric perspective distortion using a truncated normal distribution. These transformations are composed together with an initial root center crop to help avoid bordering artifacts.

Figure 5:
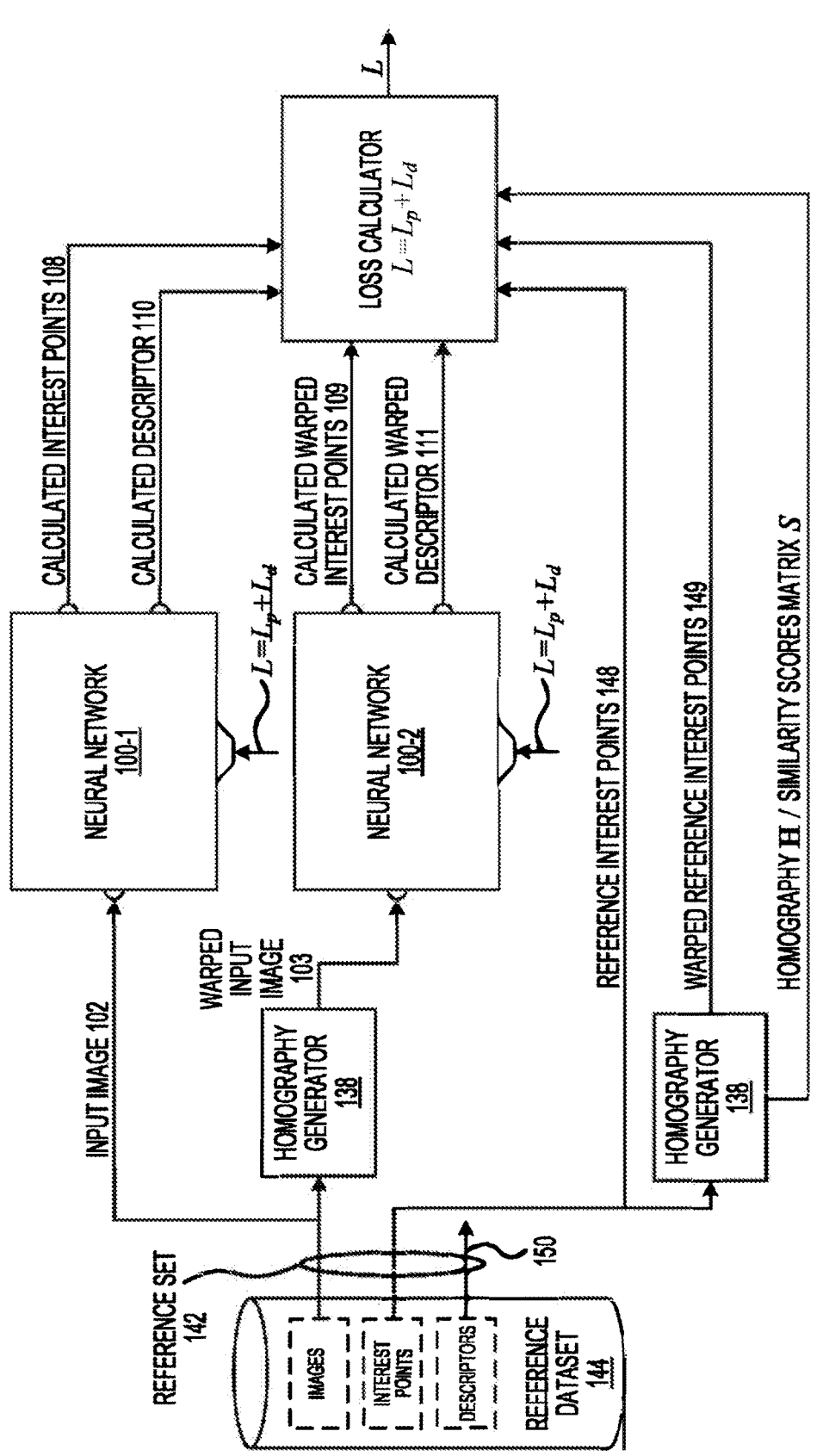
FIG. 5 illustrates a third training step in which a neural network is trained using a reference dataset.

FIG. 5 illustrates a third training step in which neural network 100 is trained using reference dataset 144. During a single training iteration, a single reference set 142 contained in reference dataset 144 is retrieved. Each reference set 142 may include an input image 102, a set of reference interest points 148 corresponding to input image 102, and (optionally) a reference descriptor 150 corresponding to input image 102. Using one or more homography generators 138, a warped input image 103 is generated by applying a homography to input image 102, and a warped set of reference interest points 149 is generated by applying the same homography to reference interest points 148. Sequentially or concurrently, neural network 100-1 receives input image 102 and calculates a set of calculated interest points 108 and a calculated descriptor 110 based on input image 102, and neural network 100-2 receives warped input image 103 and calculates a set of calculated warped interest points 109 and a calculated warped descriptor 111 based on warped input image 103.

A loss L may be calculated based on calculated interest points 108, calculated descriptor 110, calculated warped interest points 109, calculated warped descriptor 111, reference interest points 148, warped reference interest points 149, and/or the homography H, as described herein. Neural network 100 may then be modified based on loss L. Modifying neural network 100 based on loss L may include modifying only interest point detector subnetwork 112, modifying only descriptor subnetwork 114, and/or modifying both of subnetworks 112, 114. In some embodiments, neural network 100 is modified such that loss L is reduced for a subsequent run using the same reference set 142. Multiple training iterations are performed until one or more conditions are met, such as loss L dropping below a predetermined threshold and/or reference dataset 144 being exhaustively used.

In some embodiments, loss L is the sum of two intermediate losses: one for the interest point detector, $L_p$, and one for the descriptor, $L_d$. Simultaneous loss optimization is enabled due to the availability of pairs of synthetically warped image which have both (a) pseudo-ground truth interest point locations and (b) the ground truth correspondence from a randomly generated homography H which relates the two images. Loss L is balanced as a function on $\lambda$ by $$L(X, X', D, D', Y, Y', S) = L_p(X, Y) + L_p(X', Y') + \lambda L_d(D, D', S) \quad \text{Eq. 5}$$

where X is (or is related to) calculated interest points 108, X' is (or is related to) calculated warped interest points 109, Y is (or is related to) reference interest points 148, Y' is (or is related to) warped reference interest points 149, D is (or is related to) calculated descriptor 110, and D' is (or is related to) calculated warped descriptor 111. S is the similarity scores matrix and may be determined based entirely on the randomly generated homography H. As illustrated in FIG. 5, either homography H or similarity scores matrix S may be fed into the loss calculator.

The interest point detector loss function $L_p$ is a fully convolutional cross entropy loss over the cells $x_{hw} \in X$. The corresponding ground-truth interest point labels Y and individual entries are $y_{hw}$. The loss is thus:

$$L_p(X, Y) = \frac{1}{H_c W_c} \sum_{h=1, w=1}^{H_c W_c} l_p(x_{hw}; y_{hw}) \quad \text{Eq. 6}$$

Where $$l_p(x_{hw}; y_{hw}) = -\log\left(\frac{\exp(x_{hwy})}{\sum_{k=1}^{65} \exp(x_{hwk})}\right) \quad \text{Eq. 7}$$

The descriptor loss is applied to all pairs of descriptor cells $d_{hw} \in D$ from input image 102 and $d'_{h'w'} \in D'$ from warped input image 103. The homography-induced correspondence between the (h, w) cell and the (h', w') cell can be written as follows:

$$s_{hwh'w'} = \begin{cases} 1 & \text{if } \left\| \widehat{Hp_{hw}} - p_{h'w'} \right\| \le 8 \\ 0 & \text{otherwise} \end{cases} \quad \text{Eq. 8}$$

Where $p_{hw}$ denotes the location of the center pixel in the (h, w) cell, and $\widehat{Hp_{hw}}$ denotes multiplying the cell location $p_{hw}$ by the homography H. The entire set of correspondence for a pair of images is S.

In some embodiments, a weighting term $\lambda_d$ helps balance the presence of more positive correspondences than negative ones. The descriptor loss is given by:

$$L_d(D, D', S) = \frac{1}{(H_c W_c)^2} \sum_{h=1, w=1}^{H_c W_c} \sum_{h'=1, w'=1}^{H_c W_c} l_d(d_{hw}, d'_{h'w'}; s_{hwh'w'}) \quad \text{Eq. 9}$$

where $$l_d(d, d'; s) = \lambda_d * s * \max(0, m_p - d^T d') + (1-s) * \max(0, d^T d' - m_n) \quad \text{Eq. 10}$$

Figure 6:
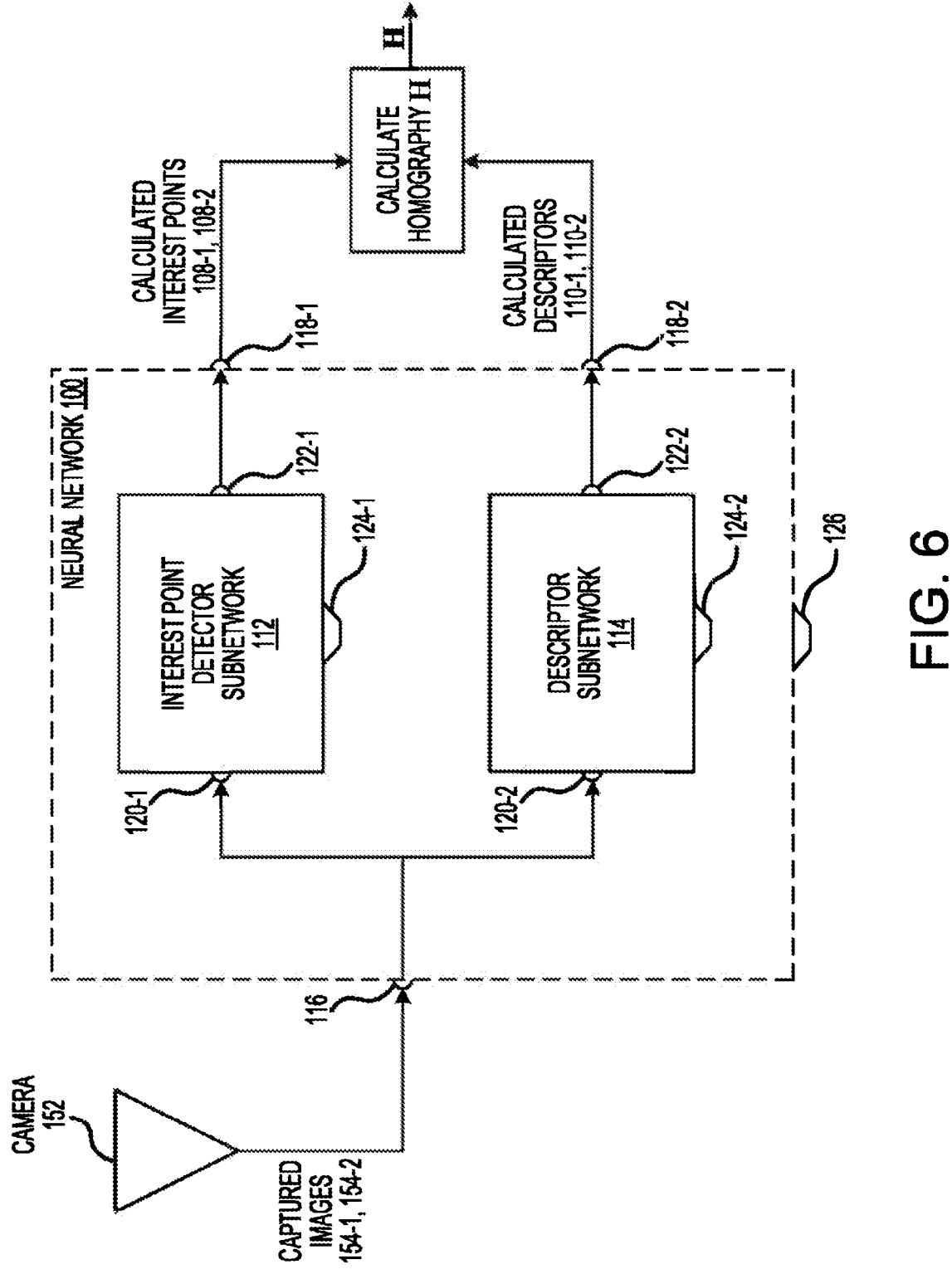
FIG. 6 illustrates a calculation of a homography between two captured images using a neural network.

FIG. 6 illustrates the calculation of a homography H between two captured images 154-1, 154-2 using neural network 100. The illustrated embodiment may correspond to a number of systems or devices utilizing neural network 100, such as an optical device, e.g., an AR or mixed reality (MR) device, a self-driving car, an unmanned aerial vehicle, a manned vehicle, a robot, among other possibilities.

After training using the techniques described herein, neural network 100 may operate in a runtime mode in which captured images 154-1, 154-2 are received from a single camera 152 or from multiple cameras. For example, captured image 154-1 may be received from a first camera and captured image 154-2 may be received from a second camera. Captured images 154-1, 154-2 may be captured by different cameras simultaneously or at different times by different cameras or by a single camera. Neural network 100 may receive captured images 154-1, 154-2 via network input 116 and may calculate a set of calculated interest points 108-1 and a calculated descriptor 110-1 based on captured image 154-1, and a set of calculated interest points 108-2 and a calculated descriptor 110-2 based on captured image 154-2.

In some embodiments, prior to determining homography H, point correspondences 106 are determined by a comparison between calculated interest points 108-1 and 108-2, which is informed by the descriptors associated with each of the interest points. For example, descriptors associated with different interest points may be matched. The interest points corresponding to different images having the most similar descriptors may be determined to correspond to each other, according to one of several possible similarity scoring procedures. Homography H may be calculated from point correspondences 106. For example, a relative pose between captured images 154-1, 154-2 may be calculated based on point correspondences 106, and homography H may by calculated as the matrix that represents the camera rotation and translation of the relative pose. Additionally or alternatively, the relative pose may be equal to homography H.

Figure 7:
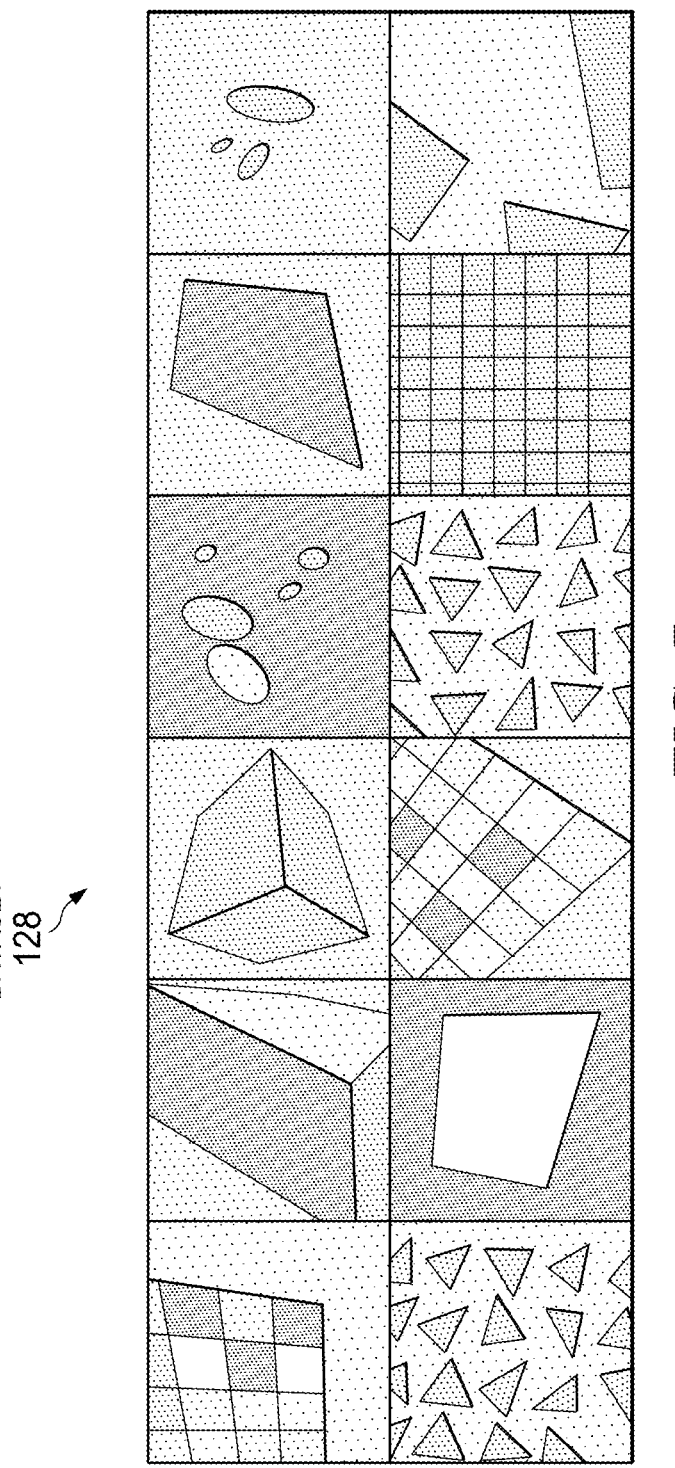
FIG. 7 illustrates an example of a synthetic dataset.

FIG. 7 illustrates an example of synthetic dataset 128. In some embodiments, synthetic dataset 128 may contain one or more shapes that are representative of a wide number of shape types that have relatively well-defined interest points, such as circles, triangles, quadrilaterals (e.g., squares, rectangles, rhombuses, parallelograms, etc.), pentagons, hexagons, stars, cubes, spheres, ellipsoids, cylinders, cones, prisms, pyramids, lines, etc.

Figure 8:
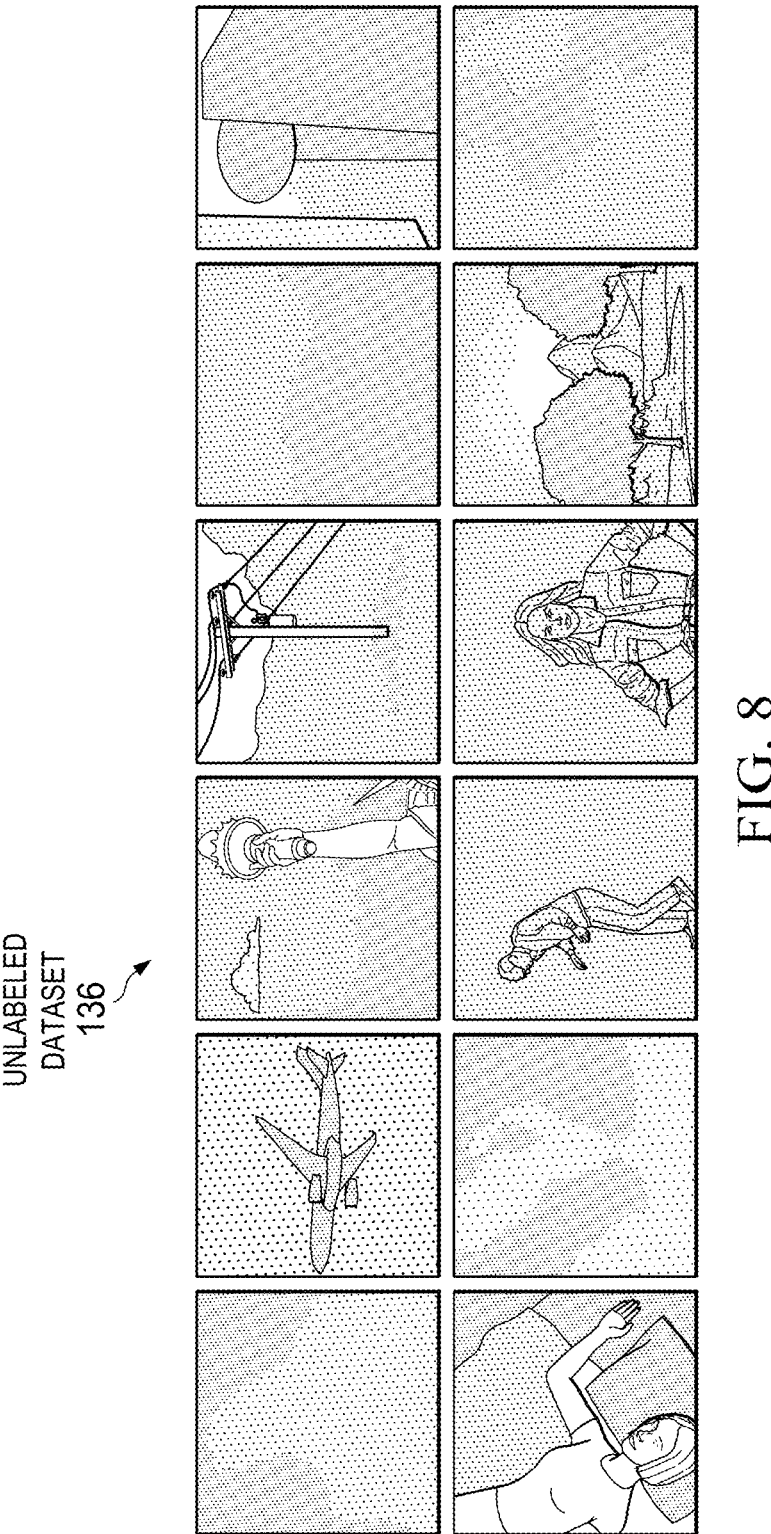
FIG. 8 illustrates an example of an unlabeled dataset.

FIG. 8 illustrates an example of unlabeled dataset 136. Unlabeled dataset 136 may contain images of the real world having varying lighting, noise, camera effects, etc. Real images are much more cluttered and noisy than synthetic images and contain diverse visual effects that cannot easily be modeled in a synthetic world.

Figure 9:
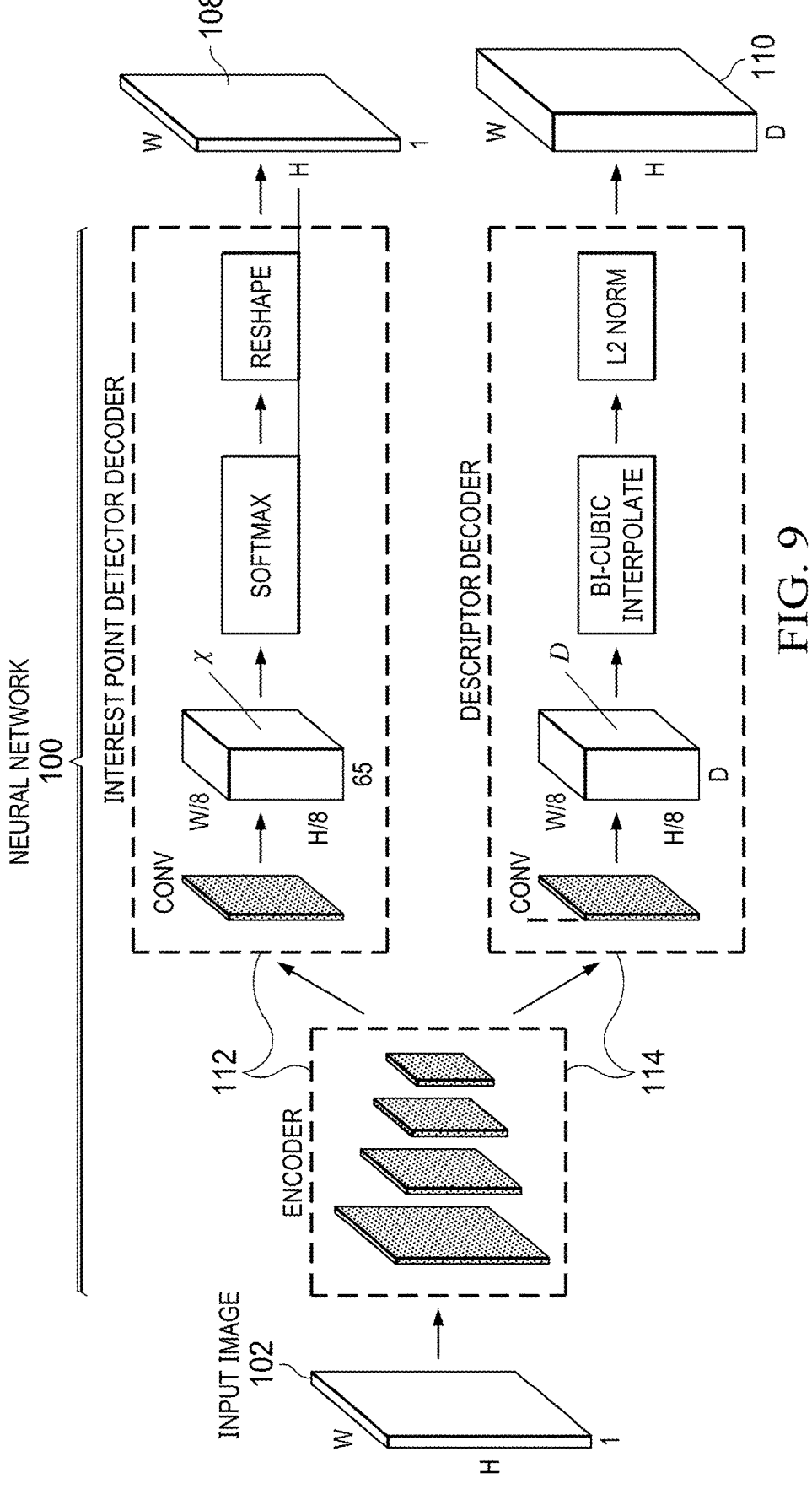
FIG. 9 illustrates an example architecture of a neural network.

FIG. 9 illustrates an example architecture of neural network 100. In the illustrated embodiment, neural network 100 includes a single shared encoder that processes and reduces the input image dimensionality. Once processed by the encoder, in some embodiments, the architecture splits into two decoder "heads," which learn task specific weights, one for interest point detection and the other for interest point description.

In some embodiments, neural network 100 uses a VGG-style encoder to reduce the dimensionality of the image. The encoder consists of convolutional layers, spatial downsampling via pooling operations and non-linear activation functions. In some embodiments, the encoder is three maxpooling layers, defining $H_c = H/8$ and $W_c = W/8$ for image I of dimensions H×W. Pixels in lower dimensional outputs are referred to as cells, where three 2×2 non overlapping max pooling operations in the encoder result in 8×8 pixel cells.

The encoder maps the input image $I \in R^{Hc \times Wc \times F}$ with smaller spatial dimension and greater channel depth (i.e., $H_c < H$, $W_c < W$, and $F > 1$).

In some instances, network design for dense prediction may involve an encoder-decoder pair, where the spatial resolution is decreased via pooling or strided convolution, and then upsampled back to full resolution via upconvolution operations. Unfortunately, upsampling layers tend to add a high amount of compute and can introduce unwanted checkerboard artifacts, thus for some of the embodiments disclosed herein the interest point detection decoder head utilizes an explicit decoder to reduce the computation of the model. In some embodiments, the interest point detector head computes a value, $X \in R^{Hc \times Wc \times 65}$ and outputs a tensor sized $X \in R^{H \times W}$. The 65 channels correspond to local, non-overlapping 8×8 grid regions of pixels plus an extra "no interest point" dustbin. After a channel-wise softmax function, the dustbin dimension is removed and a $R^{Hc \times Wc \times 64}$ to $R^{H \times W}$ reshape function is performed.

The descriptor head computes $D \in R^{Hc \times Wc \times D}$ and outputs a tensor sized $R^{H \times W \times D}$. To output a dense map of L2-normalized fixed length descriptors, a model similar to UCN may be used to first output a semi-dense grid of descriptors (for example, one every 8 pixels). Learning descriptors semi-densely rather than densely reduces training memory and keeps the run-time tractable. The decoder then performs bicubic interpolation of the descriptor and then L2-normalizes the activations to be unit length. As depicted in FIG. 9, both decoders operate on a shared and spatially reduced representation of the input. To keep the model fast and easy to train, in some embodiments, both decoders use non-learned upsampling to bring the representation back to $R^{H \times W}$.

In some embodiments, the encoder is a VGG-like architecture with eight 3×3 convolution layers sized 64-64-64-64-128-128-128-128. Every two layers there is a 2×2 max pool layer. Each decoder head has a single 3×3 convolutional layer of 256 units followed by a 1×1 convolution layer with 65 units and 256 units for the interest point detector and descriptor respectively. All convolution layers in the network may be followed by ReLU non-linear activation and BatchNorm normalization.

Figure 10:
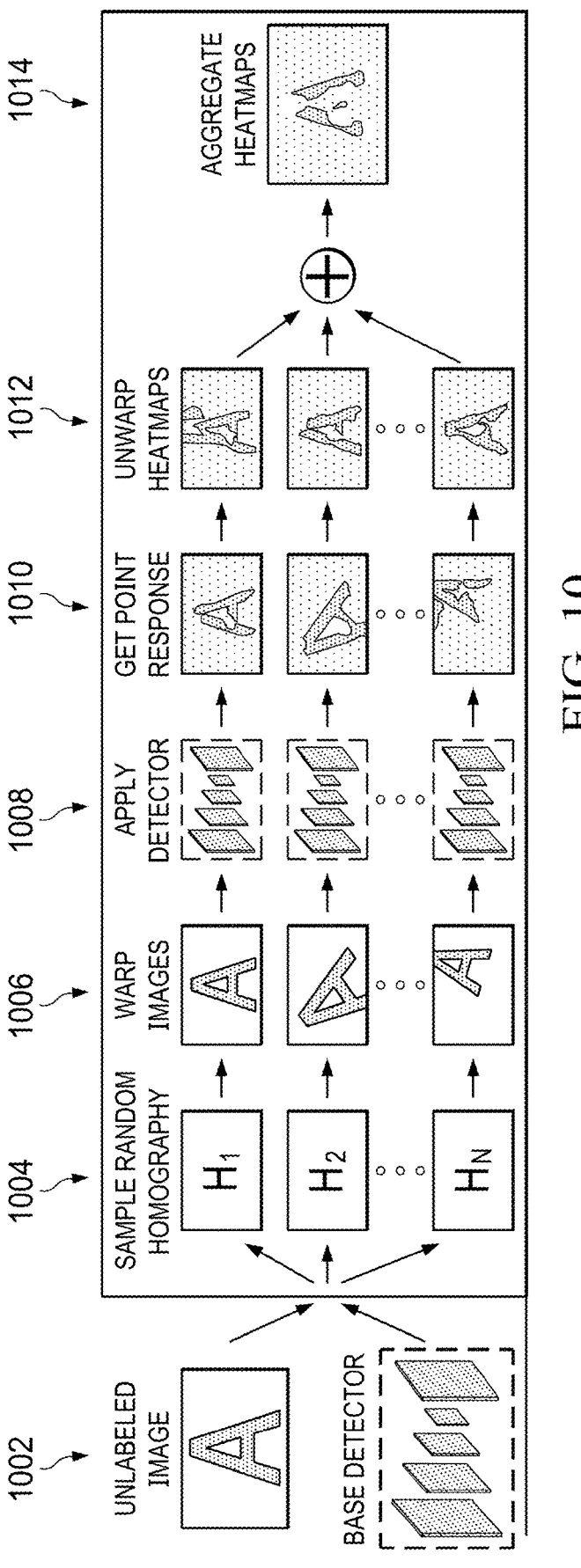
FIG. 10 illustrates various steps of the homographic adaptation that is employed during the second training step.

FIG. 10 illustrates various steps of the homographic adaptation that is employed during the second training step (described in reference to FIG. 4). At step 1002, an unlabeled image (e.g., input image 102) is taken from unlabeled dataset 136. At step 1004, a number of random homographies are sampled at homography generator 138. At step 1006, the random homographies are applied to the unlabeled image, generating a number of warped images. At step 1008, the warped images are passed through interest point detector subnetwork 112. At step 1010, a number of point responses (e.g., sets of calculated interest points 108) are calculated by interest point detector subnetwork 112. At step 1012, the point responses (i.e., heatmaps) are unwarped by applying a number of inverse homographies (generated by inverse homography generator 140) to the point responses, generating a number of unwarped heatmaps. At step 1014, the unwarped heatmaps are aggregated by, for example, averaging, summing, or combining through one of various available techniques.

Figure 11:
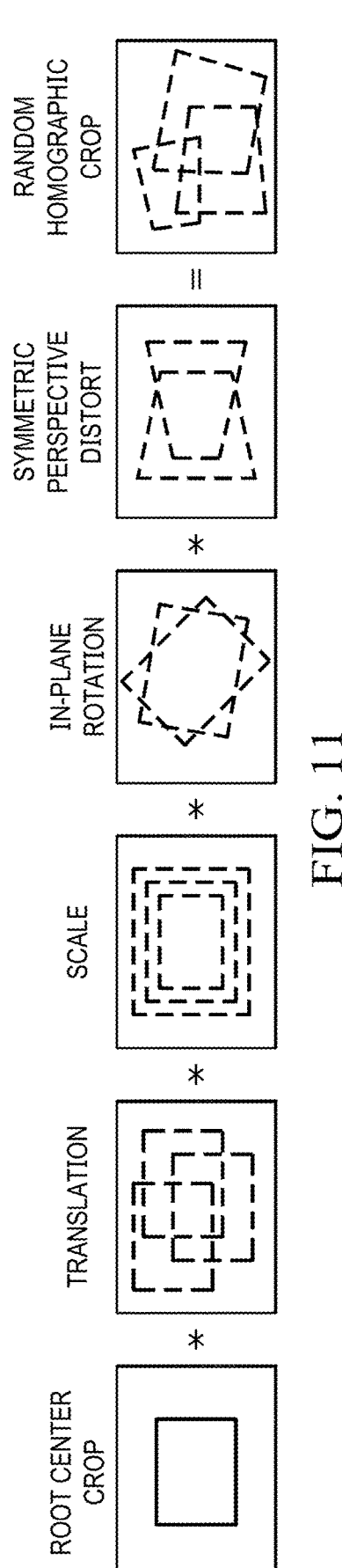
FIG. 11 illustrates certain aspects of random homography generation.

FIG. 11 illustrates certain aspects of random homography generation. To generate random realistic homographic transformations, a homography can be decomposed into more simple transformations, such as translations, scaling, rotations, and symmetric perspective distortion. To help avoid bordering artifacts, which happens when the sample region contains pixels outside of the original image, the random homography begins with a center crop, as illustrated in FIG. 11. The transformation magnitudes of the simple transformations are random Gaussian and uniform distributions. To generate the final homographic transformation, the randomly sampled simple transformations are applied consecutively to obtain the final homography.

Figure 12:
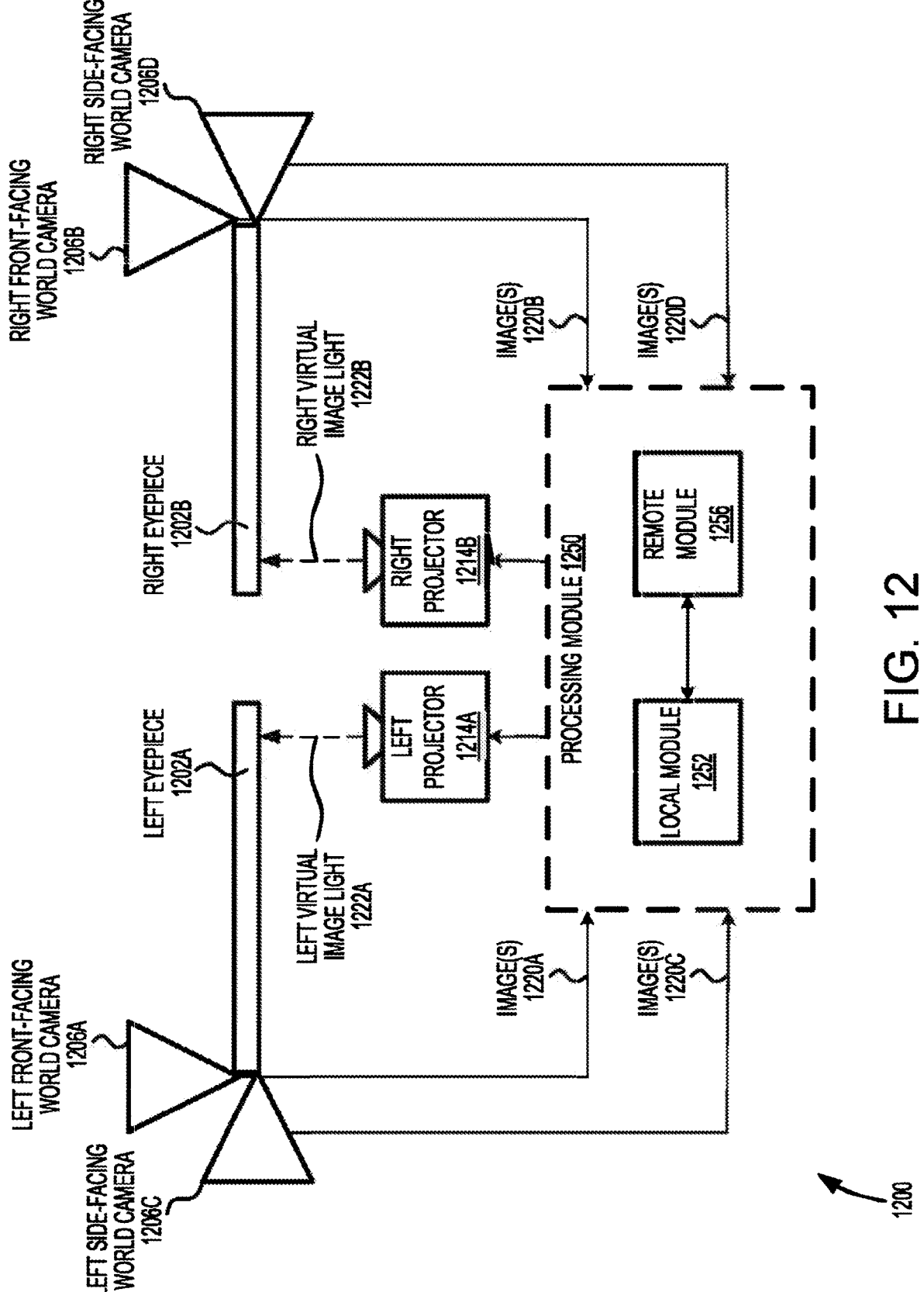
FIG. 12 illustrates a schematic view of an AR device that may utilize embodiments described herein.

FIG. 12 illustrates a schematic view of an AR device 1200 that may utilize embodiments described herein. AR device 1200 may include a left eyepiece 1202A and a right eyepiece 1202B. In some embodiments, AR device 1200 includes one or more sensors including, but not limited to: a left front-facing world camera 1206A attached directly to or near left eyepiece 1202A, a right front-facing world camera 1206B attached directly to or near right eyepiece 1202B, a left side-facing world camera 1206C attached directly to or near left eyepiece 1202A, a right side-facing world camera 1206D attached directly to or near right eyepiece 1202B, a left eye tracker positioned so as to observe a left eye of a user, a right eye tracker positioned so as to observe a right eye of a user, and an ambient light sensor, among other possibilities. In some embodiments, AR device 1200 includes one or more image projection devices such as a left projector 1214A optically linked to left eyepiece 1202A and a right projector 1214B optically linked to right eyepiece 1202B.

Some or all of the components of AR device 1200 may be head mounted such that projected images may be viewed by a user. In one particular implementation, all of the components of AR device 1200 shown in FIG. 12 are mounted onto a single device (e.g., a single headset) wearable by a user. In another implementation, one or more components of a processing module 1250 are physically separate from and communicatively coupled to the other components of AR device 1200 by one or more wired and/or wireless connections. For example, processing module 1250 may include a local module 1252 on the head mounted portion of AR device 1200 and a remote module 1256 physically separate from and communicatively linked to local module 1252. Remote module 1256 may be mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Processing module 1250 may include a processor and an associated digital memory, such as non-volatile memory (e.g., flash memory), both of which may be utilized to assist in the processing, caching, and storage of data. The data may include data captured from sensors (which may be, e.g., operatively coupled to AR device 1200) or otherwise attached to a user, such as cameras 1206, the ambient light sensor, eye trackers, microphones, inertial measurement units, accelerometers, compasses, GPS units, radio devices, and/or gyros. For example, processing module 1250 may receive image(s) 1220 from cameras 1206. Specifically, processing module 1250 may receive left front image(s) 1220A from left front-facing world camera 1206A, right front image(s) 1220B from right front-facing world camera 1206B, left side image(s) 1220C from left side-facing world camera 1206C, and right side image(s) 1220D from right side-facing world camera 1206D. In some embodiments, image(s) 1220 may include a single image, a pair of images, a video including a stream of images, a video including a stream of paired images, and the like. Image(s) 1220 may be periodically generated and sent to processing module 1250 while AR device 1200 is powered on, or may be generated in response to an instruction sent by processing module 1250 to one or more of the cameras. As another example, processing module 1250 may receive ambient light information from the ambient light sensor. As another example, processing module 1250 may receive gaze information from the eye trackers. As another example, processing module 1250 may receive image information (e.g., image brightness values) from one or both of projectors 1214.

Eyepieces 1202A, 1202B may include transparent or semi-transparent waveguides configured to direct and out-couple light from projectors 1214A, 1214B, respectively. Specifically, processing module 1250 may cause left projector 1214A to output left virtual image light 1222A onto left eyepiece 1202A, and may cause right projector 1214B to output right virtual image light 1222B onto right eyepiece 1202B. In some embodiments, each of eyepieces 1202 may include one or more waveguides corresponding to different colors and/or different depth planes. Cameras 1206A, 1206B may be positioned to capture images that substantially overlap with the field of view of a user's left and right eyes, respectively. Accordingly, placement of cameras 1206 may be near a user's eyes but not so near as to obscure the user's field of view. Alternatively or additionally, cameras 1206A, 1206B may be positioned so as to align with the incoupling locations of virtual image light 1222A, 1222B, respectively. Cameras 1206C, 1206D may be positioned to capture images to the side of a user, e.g., in a user's peripheral vision or outside the user's peripheral vision. Image(s) 1220C, 1220D captured using cameras 1206C, 1206D need not necessarily overlap with image(s) 1220A, 1220B captured using cameras 1206A, 1206B.

FIG. 13 illustrates a method 1300 of training neural network 100 and performing image interest point detection and description using neural network 100. One or more steps of method 1300 may be performed in an order different than that shown in the illustrated embodiment, and one or more steps of method 1300 may be omitted during performance of method 1300.

At step 1302, neural network 100 is trained. At step 1302-1, interest point detector subnetwork 112 of neural network 100 is trained using synthetic dataset 128. Synthetic dataset 128 may include one or more synthetic images and one or more sets of synthetic interest points corresponding to the one or more synthetic images. Step 1302-1 is further described in reference to FIG. 3.

At step 1302-2, reference dataset 144 is generated using interest point detector subnetwork 112 and/or descriptor subnetwork 114. In some embodiments reference dataset 144 is generated using homographic adaptation in which one or more warped images are generated by applying one or more homographies to input image 102, and one or more sets of calculated interest points 108 are calculated by passing the one or more warped images through interest point detector subnetwork 112. The one or more sets of calculated interest points 108 are then unwarped and aggregated to obtain the set of reference interest points that is stored in reference dataset 144. Additionally or alternatively, one or more calculated descriptors 110 are calculated by passing the one or more warped images through descriptor subnetwork 114. The one or more calculated descriptors 110 are then unwarped and aggregated to obtain the reference descriptor that is stored in reference dataset 144. Step 1302-2 is further described in reference to FIG. 4.

At step 1302-3, interest point detector subnetwork 112 and descriptor subnetwork 114 are concurrently trained using reference dataset 144. During a single training iteration, a reference set 142 including input image 102, reference interest points 148, and (optionally) reference descriptor 150 is retrieved from reference dataset 144 and is used to calculate loss L. One or both of interest point detector subnetwork 112 and descriptor subnetwork 114 may be modified based on the calculated loss L. Step 1302-3 is further described in reference to FIG. 5.

At step 1304, image interest point detection and description is performed using neural network 100. In some embodiments, a first captured image 154-1 and a second captured image 154-2 are captured using camera 152 or two different cameras. Captured images 154-1, 154-2 may then be passed through neural network 100. Calculated interest points 108-1, 108-2 and calculated descriptors 110-1, 110-2 may be used to calculate homography H. In some embodiments, AR device 1200 may adjust one or both of virtual image light 1222A, 1222B based on homography H. For example, when a user of AR device 1200 turns his/her head while viewing virtual content perceived by the user viewing virtual image light 1222A, 1222B projected onto eyepieces 1202A, 1202B by projectors 1214A, 1214B, the virtual light will need to be adjusted based on the homography H associated with the new viewing angle. Step 1304 is further described in reference to FIG. 6.

FIG. 14 illustrates a method 1400 of training neural network 100 for image interest point detection and description. One or more steps of method 1400 may be performed in an order different than that shown in the illustrated embodiment, and one or more steps of method 1400 may be omitted during performance of method 1400.

At step 1402, warped input image 103 is generated by applying a homography to input image 102. At step 1404, warped reference interest points 149 are generated by applying the homography to reference interest points 148. At step 1406, calculated interest points 108 and calculated descriptor 110 are calculated by neural network 100 receiving input image 102 as input. At step 1408, calculated warped interest points 109 and calculated warped descriptor 111 are calculated by neural network 100 receiving warped input image 103 as input.

At step 1410, loss L is calculated based on one or more of calculated interest points 108, calculated descriptor 110, calculated warped interest points 109, calculated warped descriptor 111, reference interest points 148, warped reference interest points 149, and the homography. In some embodiments, loss L is further calculated based on the homography. At step 1412, neural network 100 is modified based on loss L.

Self-Improving Visual Odometry Based on Interest Point Stability Estimates:

As described herein, neural network 100 can be trained using reference dataset 144 to improve its performance. For example, reference dataset 144 can include images taken from unlabeled dataset 136 including, for example, real world images, as well as reference interest points and reference descriptors. For example, with reference to FIG. 4, input image 102 can be taken from unlabeled dataset 136 and can be provided to neural network 100, which calculates calculated interest points 108 (e.g., one or more interest points) and calculated descriptor 110 based on input image 102. Data may be stored in reference dataset 144 as reference set 142, each reference set 142 including input image 102, calculated interest points 108 corresponding to input image 102, and calculated descriptor 110 corresponding to input image 102. In some embodiments, certain data can be selectively stored in reference dataset 144 (e.g., data that is more suitable for training neural network 100), whereas certain other data can be selectively omitted from reference dataset 144 (e.g., data that is less suitable for training neural network 100). This can be beneficial, for example, in improving the ability of the training process to distinguish between interest points in an image that are more suitable for use in connection with visual odometry and interest points in an image that are less suitable for use in connection with visual odometry.

In some embodiments, data can be selected for inclusion in the reference dataset 144 based on an estimated stability of calculated interest points 108 within each input image 102. As an example, neural network 100 can calculate, for each calculated interest point 108 within input image 102, a stability metric indicating the degree to which calculated interest point 108 can be stably tracked (e.g., across one or more images in a sequence). Input images 102 having calculated interest points 108 that are stable (e.g., having a sufficiently high stability metric) can be included in reference dataset 144 (e.g., to improve the ability of neural network 100 to identify interest points within an image that are more suitable for use in connection with visual odometry). Input images 102 having calculated interest points 108 that are unstable (e.g., having a sufficiently low stability metric) also can be included in reference dataset 144 (e.g., to improve the ability of neural network 100 to identify interest points within an image that are less suitable for use in connection with visual odometry). Input images 102 having calculated interest points 108 that are neither stable or unstable (e.g., having a stability metric that is neither sufficiently high or sufficiently low) can be excluded from reference dataset 144. This can be beneficial, for example, as it excludes ambiguous data that may be less suitable for training neural network 100 (e.g., data that provides neither a clear example of a stable interest point nor a clear example of an unstable interest point).

Figure 15:
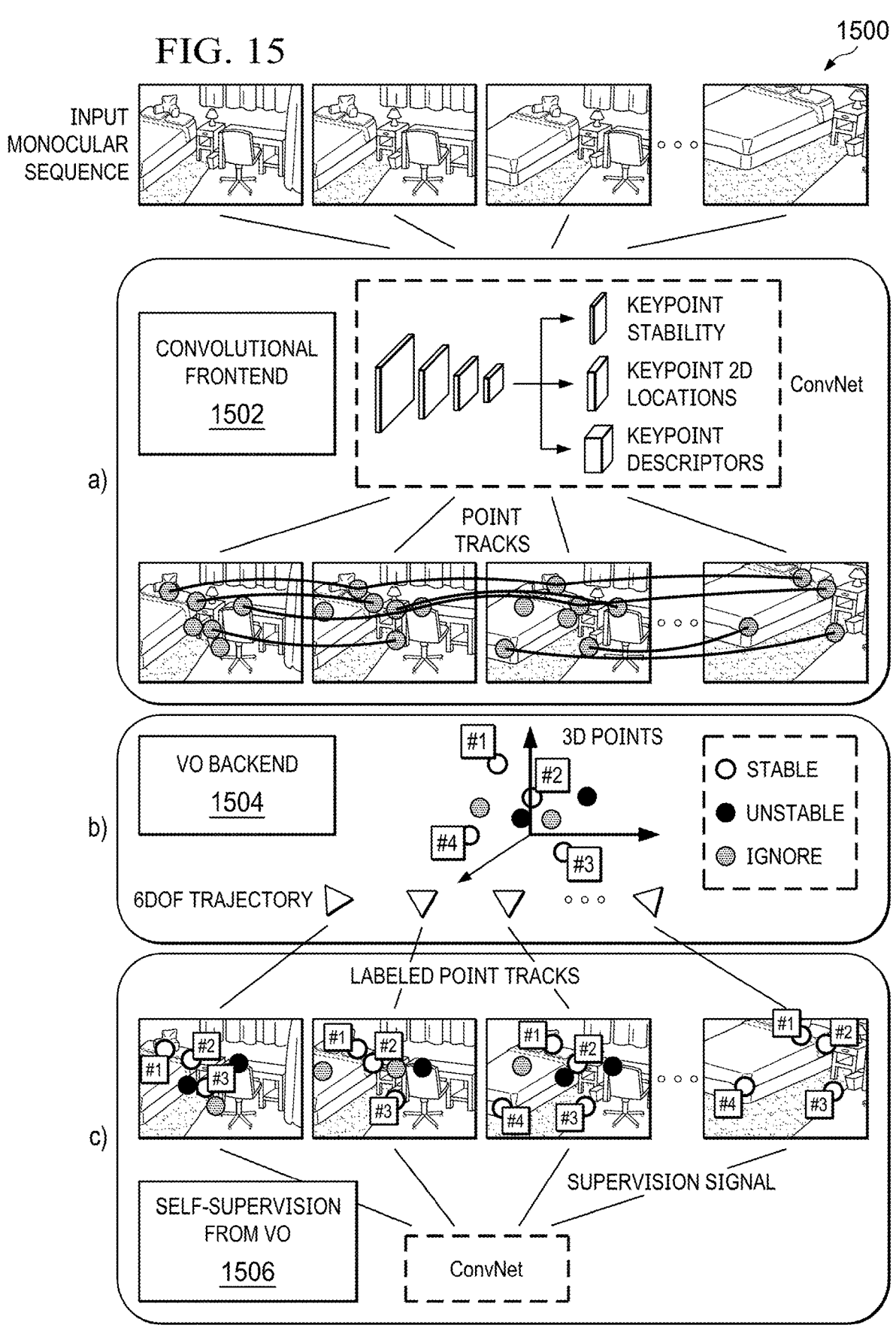
FIG. 15 illustrates an example process for training a neural network based on an estimated stability of detected interest points.

FIG. 15 shows an overview of an example process for training a neural network based on an estimated stability of detected interest points. Once trained, the neural network can be used to perform visual odometry based on or more input images. In some embodiments, the neural network can be used to track the orientation and position of a head-mounted display system within an environment of the head-mounted display system (e.g., to facilitate the presentation of virtual reality or augmented reality imagery). In some embodiments, the neural network can be implemented as a part of the head-mounted display system. In some embodiments, the neural network can be implemented using one or more computer systems remote from the head-mounted display system (e.g., a remote server, such as a "cloud" computing system).

As shown in FIG. 15, monocular images 1500 are obtained. At least some of monocular images 1500 can be obtained from a set of sequentially captured images (e.g., frames from a video sequence). Monocular images 1500 are input into convolutional frontend 1502, which identifies one or more point correspondences in the image (e.g., "point tracks" showing a correspondence between interest points or "keypoints" across different images). Point correspondences can be determined using one or more of the techniques described herein. Further, convolutional frontend 1502 calculates various metrics for each interest point, including stability, location (e.g., in two-dimensional space), and descriptor.

This information is input into visual odometry backend 1504. Visual odometry backend 1504 estimates the location of each of the interest points in three-dimensional space. Further, the visual odometry backend 1504 calculates a stability metric for each of the interest points, for example, in three-dimensional space. As an example, visual odometry backend 1504 can classify each interest point as "stable" (e.g., an interest point that can be used to train a neural network to recognize interest points that are more suitable for use in connection with visual odometry), "unstable" (e.g., an interest point that can be used to train a neural network to recognize interest points that are less suitable for use in connection with visual odometry), or "ignore" (e.g., an interest point that can be excluded from the training process). The "stable" and "unstable" interest points (and their associated point correspondences and descriptors) are used as supervision signals to train the convolutional front end (e.g., according to a self-supervision process 1606).

The stability of interest points (e.g., interest points output by the interest point detection decoder head described with respect to FIG. 9) can be determined by a stability classifier head. In some embodiments, the stability classifier head can determine a stability metric $S \in R^{H_c \times W_c \times 2}$. To compute pixel level predictions, coarse predictions are interpolated with bi-linear interpolation and followed by channel-wise soft-max over two output channels to get a final stability probability value. In some embodiments, a stability classifier decoder head can have a single 3×3 convolutional layer of 256 units followed by a 1×1 convolution layer with two units for the binary classification of "stable" versus "unstable."

Once trained, the neural network (e.g., neural network 100 of FIG. 4) can be used to form sparse optical flow tracks for an image sequence. In some embodiments, this can be performed by associating points and descriptors in consecutive pairs of images using a "connect-the-dots" algorithm. For instance, given a set of monocular images $I=[I_1, I_2, \ldots I_N]$, where $I_i \in R^{H \times W}$, the neural network can compute a corresponding set of 2D keypoints $U=[U_1, U_2, \ldots U_N]$ and $U_i \in R^{2 \times O_i}$ and descriptors $D=[D_1, D_2, \ldots D_N]$ and $D_i \in R^{256 \times O^i}$, where $O_I$ is equal to the number of points detected in the image i.

To match points across a pair of images $I_a$ and $I_b$, the neural network can take bi-directional nearest neighbors of the corresponding Da and Db. A bi-directional nearest neighbor match $(d_{ai}, d_{bj})$, where $d_{ai}, d_{bj} \in R^{256}$ is one such that the nearest neighbor match from $d_{ai}$ to $D_b$ is $d_{bj}$ and the nearest neighbor match from $d_{bj}$ to $D_a$ is $d_{ai}$. This parameter-less technique helps the algorithm use as few parameters as possible, and works well in practice. A second removal of matches can be performed to remove all matches such that $\|d_{ai} - d_{bj}\| > \tau$. In some embodiments, $\tau=0.7$. To form tracks, the same procedure is done for all consecutive pairs of images $(I_1, I_2), (I_2; I_3), \ldots, (I_{N-1}, I_N)$. This is beneficial, for example, in providing a powerful heuristic in selecting good tracks.

Once the set of tracks is established, the neural network can treat each track in the sequence as a single 3D point, and use the tracks to jointly estimate 3D scene structure and camera poses.

The neural network uses its own outputs, combined with multiple-view geometry, to create a supervised training dataset. In particular, the temporal aspect of monocular video and the mostly-rigid nature of the real world can be exploited to achieve invariance to the non-planarity of the real world. This approach may be referred to as "Visual Odometry (VO) Adaption." VO Adaptation leverages VO to label which points can be stably tracked over time and use the stable tracks to learn keypoint correspondence over many views. VO Adaption can be performed, at least in part, using the techniques described herein.

Optimization Variables

In a monocular sequence of N images, the set of camera poses for the i-th camera are represented by their rotation and translation $(R_i, t_i)$, where $R_i \in SO(3)$ and $t_i \in R^3$.

For a scene with M 3D points which re-project into some or all of the N images, each point is represented by $X_j$, where $X_j \in R^3$. There is no 3D prior structure imposed on the reconstruction, other than the depth regularization function $d(Z)$ (discussed in further detail herein) which penalizes point configurations too close (or behind) or too far from the camera.

Camera intrinsics K is an upper-triangular matrix made up of focal lengths $f_x$ and $f_y$ together with the principal point $(c_x, c_y)$. While it is possible to optimize over one K for each image (as is typically done in a SfM pipeline), in some embodiments, the neural network can assume a single, fixed K.

Observation Variables

U is a set of 2D point observations, a collection of N matrices, one for each image. $U = [U_1, U_2, \ldots U_N]$ and $U_i \in R^{2 \times O_i}$, where $O_i$ is equal to the number of 2D observations in the image i. A single image measurement is represented by $u_{ij} \in R^2$.

W is a set of observation confidence weights. The observation confidence weights are used during optimization to prioritize more confidence observations over less confident ones. Each image has a set of associated scalar weights $W = [W_1, W_2, \ldots W_N]$ where $W_i \in R^{O_i}$. Each scalar weight ranges between zero and one, i.e. $w_{ij} \in [0, 1]$.

A is a set of 3D-to-2D association tracks. Since every 3D point $X_j$ in the sparse 3D map is not observed in every frame due to the moving camera and scene occlusions, there is a set of 3D-to-2D association vectors for each image $A = [A_1, A_2, \ldots, A_N]$, where $A_i \in Z^{O_i}$. Each association integer indicates the 3D map point index it corresponds to and ranges between zero and the total number of points in the scene, i.e. $a_{ij} \in [1, M]$.

3D Projection Model

The neural network can employ a pinhole camera model for camera projection, which explains how a 3D world point gets projected into a 2D image given the camera pose and the camera intrinsics.

Letting $X_j \in R^3$ denote the j-th 3D point, $(R_i, t_i)$ the i-th camera pose, K the camera intrinsics, and $u_{ij} \in R^2$ the corresponding 2D projection:

$$\begin{bmatrix} u_{ij1} \\ u_{ij2} \\ 1 \end{bmatrix} \sim K[R_i \mid t_i] \begin{bmatrix} X_j \\ 1 \end{bmatrix} \qquad \text{Eq. 11}$$

The ~ in the above equation denotes projective equality. To simplify the calculations, the neural network can use a $R^3 \to R^2$ projection function $\Pi(X)$ which performs the 3D to 2D conversion:

$$\Pi\left(\begin{bmatrix} X \\ Y \\ Z \end{bmatrix}\right) = \frac{1}{Z}\begin{bmatrix} X \\ Y \end{bmatrix} \qquad \text{Eq. 12}$$

To measure the quality of the estimated camera poses and 3D points, the neural network can measure the re-projection of each 3D point into each camera. The squared re-projection error et for the j-th 3D point in the i-th image can be expressed as follows:

$$e_{ij}^2 = \left\| \prod (K(R_i X_{aij} + t_i)) - u_{ij} \right\|^2 \qquad \text{Eq. 13}$$

Depth Regularization

The neural network can employ a depth regularization function $$d(Z_{ij}'),$$

where $$Z_{ij}' = [R_i X_{ij} + t_{ij}]_3,$$

where [•] means taking the third component of the vector, which incurs a quadratic penalty for estimated 3D point depths $$Z_{ij}'$$

which are too close or too far from the camera, parameterized by two scalars $d_{min}$ and $d_{max}$. It also prevents depths from moving behind the camera center. In some embodiments, $d_{min}=0.1$ and $d_{max}=5.0$ may be particularly suitable for indoor scenes. The term is:

$$dd(Z_{ij}') = \max(0, Z_{ij}' - d_{max})^2 + \min(Z_{ij}' - d_{min}, 0)^2 \qquad \text{Eq. 14}$$

Camera Pose and Point Depth Initialization

The neural network can initialize each new camera pose $(R_{N+1}, t_{N+1})$ with the camera pose from the previous frame $(R_N, t_N)$. New 3D point depths can be initialized to 1.0. While the 3D points depths $$Z_{ij}'$$

can be initialized using linear triangulation methods, in some embodiments, this does not improve VO results significantly and may add more complexity to the system. In some embodiments, the point depths can be initialized at unity depth, and adding the depth regularization term may be enough of a prior for the bundle adjustment optimization to work well.

Final Bundle Adjustment Objective

The final bundle adjustment objective is the combination of the re-projection error function $$e_{ij}^2,$$

the depth regularization function, the 2D observation weights $w_{ij}$ and a Huber robust loss function $p(\bullet)$ to help deal with outliers. The final objective function for bundle adjustment, $\Omega_{BA}(\bullet)$ may be denoted as follows:

$$\Omega(\cdot) = \sum_{i=1}^{N} \sum_{j=1}^{o_i} w_{ij} \rho\left(e_{ij}^2 + d(Z_{ij}')\right) \qquad \text{Eq. 15}$$

$$\{R^*, t^*\}_{i=1}^{N}, X^* = \underset{\{R,t\}_{i=1}^{N}, X}{\arg\min} \Omega\left(\{R, t\}_{i=1}^{N}, X \mid K, \mathcal{U}, \mathcal{W}, \mathcal{A}\right) \qquad \text{Eq. 16}$$

VO Backend Implementation

In some embodiments, the bundle adjustment optimization can be performed over a fixed window of the most recent $N_{last}=30$ poses (e.g., corresponding to about one second of motion). In some embodiments, a ceres-solver package can be used to perform the Levenberg-Marquardt optimization over the bundle adjustment, $\Omega_{BA}(\bullet)$, above. In some embodiments, for each new image, the bundle adjustment can be performed for up to 100 iterations, which on average takes about one second per frame.

Labeling Stability

Once VO is complete for a given sequence, the number of observations and re-projection errors for each 3D point are used to label stability. If a point is tracked for a reasonably long time, its reprojection error can be used to classify it as "stable" versus "unstable."

For example, let $T_j$ denote the number of observations tracked to form a 3D point $X_j$, and let mean($e_j$) and max($e_j$) be the mean and maximum of the re-projections respectively into each observed camera. The stability $S_j$ of that 3D point can be defined as:

$$S = \begin{cases} \text{stable}, & \text{if } (T_j \geq 10) \text{ and } (\text{mean}(e_j) \leq 1) \\ \text{unstable}, & \text{else if } (T_j \geq 10) \text{ and } (\text{max}(e_j) \geq 5) \\ \text{ignore}, & \text{otherwise} \end{cases} \qquad \text{Eq. 17}$$

In other words, stable points are those which have been tracked for at least a predetermined number of frames (e.g., ten frames) and have an average reprojection error less than a predetermined number of pixels (e.g., one pixel). Unstable points are those which have been tracked for at least a predetermined number of frames (e.g., ten frames) and have a maximum re-projection error of more than a predetermined number of pixels (e.g., five pixels). The points which do not satisfy these two constraints are ignored during training—the network can decide to treat them as stable, unstable, or neither as it chooses.

The self-labeling procedure discovers unstable regions such as t-junctions across depth discontinuities, features on shadows and highlights, and dynamic objects like people, and the like.

Although example threshold values are described above, in practice, other threshold values can be used, depending on the implementation. For example, stable points and/or unstable points can be determined based on a different threshold number of frames other than ten (e.g., 5, 15, 20, 25, or some other number of frames). As another example, stable points can be determined based on a different threshold error value other than one (e.g., 0.1, 0.5, 1.5, or some other error value). As another example, stable points can be determined based on a different threshold error value other than five (e.g., 2, 3, 4, or some other error value). In some embodiments, the threshold values can be determined empirically (e.g., based on experiments conducted on sample data).

Siamese Training

In some embodiments, the neural network can be trained using a Siamese training technique. For example, the descriptor can be trained using Siamese metric learning, and the keypoint detector can be trained using a softmax+cross entropy loss. The pairs can be randomly sampled from a temporal window of +/−a predetermined number of frames (e.g., 60 frames), resulting in pairs with a maximum time window of a predetermined number of seconds (e.g., about 4 seconds). The loss functions can also incorporate the "ignore class," which is used for unknown correspondences and unknown 2D point locations.

To train the stability classifier, the neural network can employ an extra loss term to the final loss of $\mathcal{L}_8$ which denotes the stability loss. The stability loss can be trained with a standard binary cross-entropy loss function.

Figure 16:
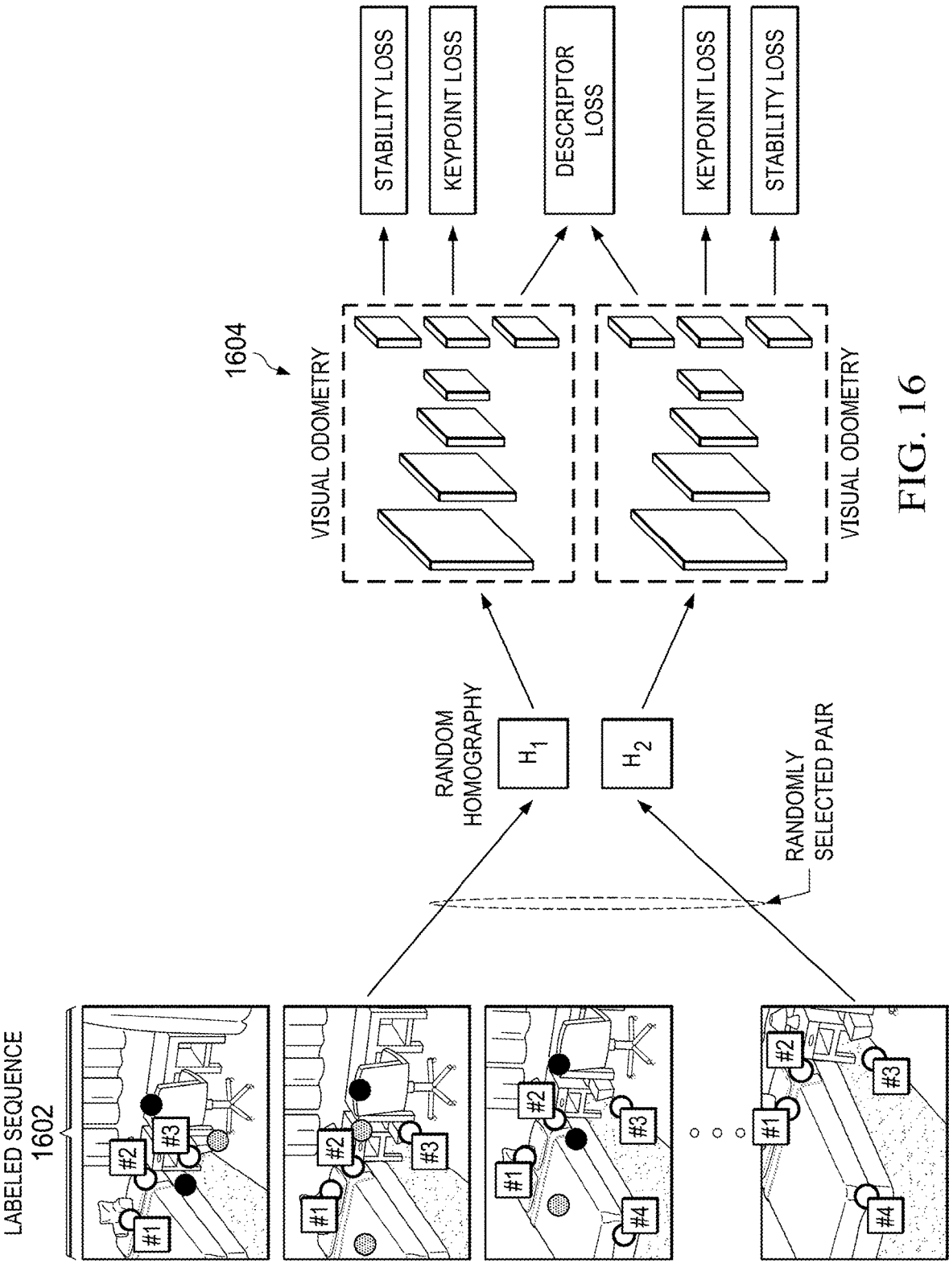
FIG. 16 illustrates an example Siamese training process.

A schematic example of a Siamese training process is shown in FIG. 16. A labeled sequence of images 1602 is obtained (e.g., including labeled interest points and descriptors). Random nearby image pairs are selected from a labeled sequence, and warped by a random homography (e.g., $H_1$ and $H_2$) before being used to train the network tasks described herein (e.g., visual odometry tasks 1604). Stability, keypoint, and/or descriptor losses can be calculated and minimized across successive iterations of the training process.

Figure 17:
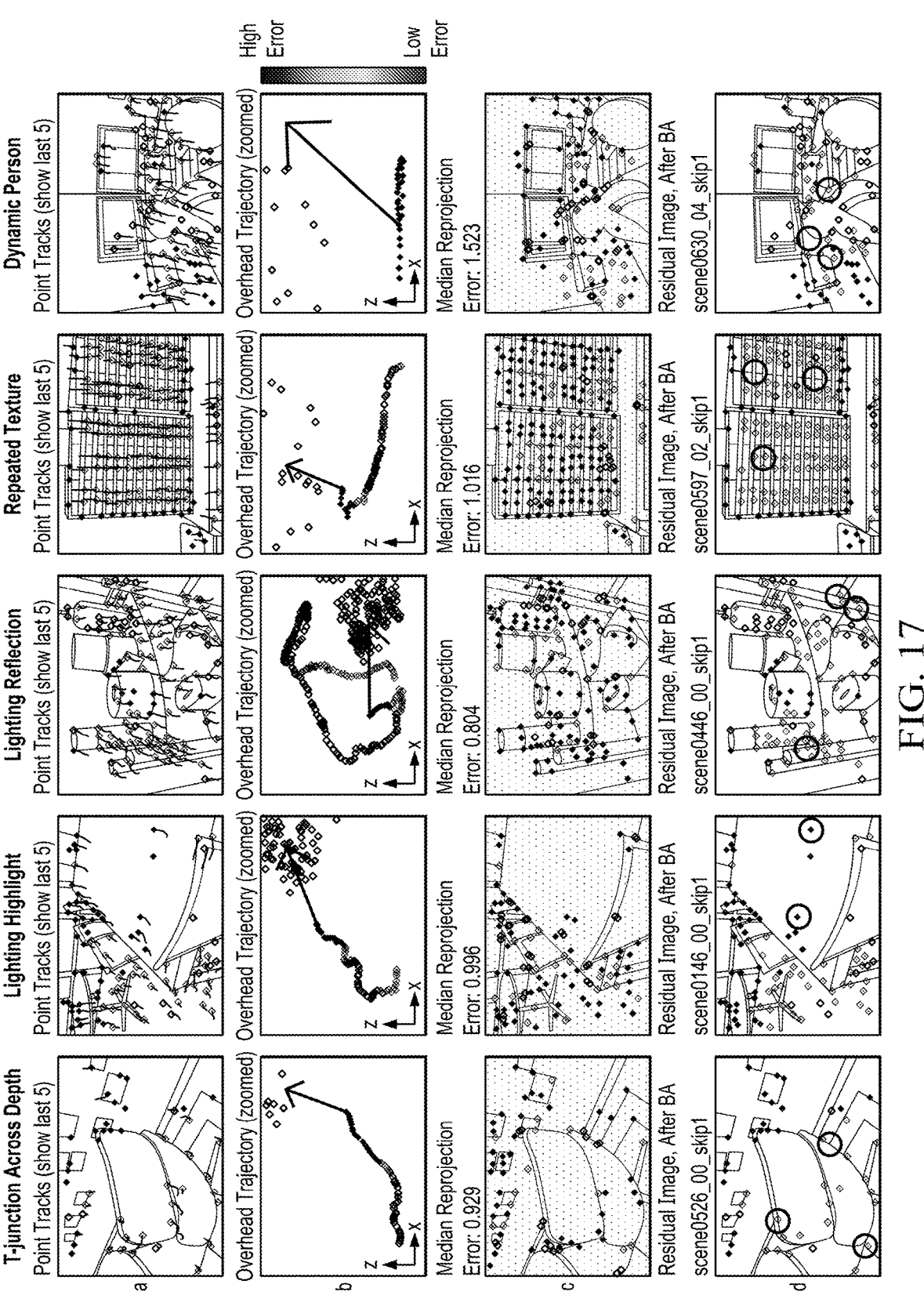
FIG. 17 illustrate examples of the labeling of interest points.

Example Labeling of Interest Points:

FIG. 17 shows examples of the labeling of interest points using the techniques described herein. Five examples of patterns labeled by VO to have a low stability due to five different effects are shown in each column. Row (a) shows sparse point tracks from the convolutional frontend. Row (b) shows the overhead projection of the computed VO backend camera pose trajectory and the sparse 3D map. Row (c) shows the re-projection error residual images (magnitude of the error is color coded according to the color bar in row (c). Row (d) shows labeled point tracks with stability labels (lighter diamond=stable, medium diamond=unstable, darker diamond=ignore, circled medium diamond=characteristic example of unstable point).

Example Method for Training a Neural Network for Performing Visual Odometry:

FIG. 18 shows an example method 1800 for training a neural network for performing visual odometry. Method 1800 can be performed one or more of the techniques and/or system described herein. As an example, method 1800 can be performed, at least in part, by neural network 100 and implemented using one or more computer systems.

According to method 1800, a neural network receives a plurality of images of an environment (step 1802). In some embodiments, the plurality of images include two-dimensional images extracted from a video sequence. In some embodiments, the plurality of images correspond to non-contiguous frames of the video sequence.

The neural network determines, for each image, a respective set of interest points and a respective descriptor (step 1804). Interest points can be determined using one or more of the techniques described herein. For example, interest points can be determined by the interest point detection decoder head described with respect to FIG. 9.

The neural network determines a correspondence between the plurality of images based on the sets of interest points and the descriptors of the plurality of images (step 1806). In some embodiments, determining the correspondence includes determining one or more point correspondences between the sets of interest points, where each point correspondence indicates a respective correspondence between an interest point of one image and an interest point of another image. In some embodiments, determining the correspondence further includes determining, based on the one or more point correspondences, a set of candidate interest points. Each candidate interest point can indicate a respective feature in the environment in 3D space.

The neural network determines, for each candidate interest point, a respective stability metric (step 1808).

In some embodiments, determining a respective stability metric for each candidate interest point includes determining that a first candidate interest point is stable. The neural network can be modified based on this determination. For example, responsive to determining that the first candidate interest point is stable, the neural network can select the first candidate interest point and a first pair of images from among the plurality of images to train the neural network, the first pair of images depicting the first candidate interest point in the environment.

In some embodiments, the neural network can determine that the first candidate interest point is stable by determining that the first candidate interest point is depicted in a number of images of the plurality of images exceeding a first threshold number, and determining that a re-projection error associated with the first candidate interest point is less than a first threshold error level.

In some embodiments, determining a respective stability metric for each candidate interest point includes determining that a second candidate interest point is stable. The neural network can be modified based on this determination. For example, responsive to determining that the second candidate interest point is stable, the neural network can select the second candidate interest point and second pair of images from among the plurality of images to train the neural network, the second pair of images depicting the second candidate interest point in the environment.

In some embodiments, the neural network can determine that the second candidate interest point is unstable by determining that the second candidate interest point is depicted in a number of images of the plurality of images exceeding a second threshold number, and determining that a re-projection error associated with the second candidate interest point is greater than a second threshold error level. In some embodiments, the first threshold number can be equal to the second threshold number. In some embodiments, the first threshold error level can be less than the second threshold error level.

In some embodiments, determining a respective stability metric for each candidate interest point includes determining that a third candidate interest point is to be omitted from the training of the neural network. In some embodiments, the neural network can determine that the third candidate interest point is to be omitted from the training of the neural network by determining that (i) the third candidate interest point is depicted in a number of images of the plurality of images less than a third threshold number and/or (ii) determining that a re-projection error associated with the third candidate interest point is between the first threshold error level and the second threshold error level. In some embodiments, the third threshold number can be equal to the first threshold number.

The neural network is modified based on the one or more candidate interest points (step 1810). For example, the neural network can be trained based on at least some of the candidate interest points, depending on their respective stability metrics. For instance, at least some of the candidate interest points (e.g., stable and unstable interest points) can be used to train the neural network to distinguish between interest points in an image that are more suitable for use in connection with visual odometry from interest points in an image that are less suitable for use in connection with visual odometry. Other interest points can be omitted from the training process.

In some embodiments, subsequent to modifying the neural network, the neural network can receive a second plurality of images of a second environment from a head-mounted display device. Further, the neural network can identify a second set of interest points, and perform visual odometry with respect to the second environment based on the second plurality of images and the second set of interest points. Performing visual odometry with respect to the second environment can include determining a position and orientation of the head-mounted display device using the second set of interest points as landmarks.

Figure 19:
FIG. 19 illustrates a simplified computer system according to some embodiments described herein.

Example Computer System:

FIG. 19 illustrates a simplified computer system 1900 according to some embodiments described herein. FIG. 19 provides a schematic illustration of one example of computer system 1900 that can perform some or all of the steps of the methods provided by various embodiments. It should be noted that FIG. 19 is meant only to provide a generalized illustration of various components, any or all of which may be utilized as appropriate. FIG. 19, therefore, broadly illustrates how individual system elements may be implemented in a relatively separated or relatively more integrated manner.

Computer system 1900 is shown including hardware elements that can be electrically coupled via a bus 1905, or may otherwise be in communication, as appropriate. The hardware elements may include one or more processors 1910, including without limitation one or more general-purpose processors and/or one or more special-purpose processors such as digital signal processing chips, graphics acceleration processors, and/or the like; one or more input devices 1915, which can include without limitation a mouse, a keyboard, a camera, and/or the like; and one or more output devices 1920, which can include without limitation a display device, a printer, and/or the like.

Computer system 1900 may further include and/or be in communication with one or more non-transitory storage devices 1925, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1900 might also include a communications subsystem 1819, which can include without limitation a modem, a network card (wireless or wired), an infrared communication device, a wireless communication device, and/or a chipset such as a Bluetooth device, an 802.11 device, a WiFi device, a WiMax device, cellular communication facilities, etc., and/or the like. The communications subsystem 1919 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1919. In other embodiments, a portable electronic device, e.g. the first electronic device, may be incorporated into computer system 1900, e.g., an electronic device as an input device 1915. In some embodiments, computer system 1900 will further include a working memory 1935, which can include a RAM or ROM device, as described above.

Computer system 1900 also can include software elements, shown as being currently located within the working memory 1935, including an operating system 1940, device drivers, executable libraries, and/or other code, such as one or more application programs 1945, which may include computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1925 described above. In some cases, the storage medium might be incorporated within a computer system, such as computer system 1900. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1900 and/or might take the form of source and/or installable code, which, upon compilation and/or installation on computer system 1900 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1900 to perform methods in accordance with various embodiments of the technology. According to a set of embodiments, some or all of the procedures of such methods are performed by computer system 1900 in response to processor 1910 executing one or more sequences of one or more instructions, which might be incorporated into the operating system 1940 and/or other code, such as an application program 1945, contained in the working memory 1935. Such instructions may be read into the working memory 1935 from another computer-readable medium, such as one or more of the storage device(s) 1925. Merely by way of example, execution of the sequences of instructions contained in the working memory 1935 might cause the processor(s) 1910 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In embodiments implemented using computer system 1800, various computer-readable media might be involved in providing instructions/code to processor(s) 1910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1925. Volatile media include, without limitation, dynamic memory, such as the working memory 1935.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1900.

The communications subsystem 1919 and/or components thereof generally will receive signals, and the bus 1905 then might carry the signals and/or the data, instructions, etc. carried by the signals to the working memory 1935, from which the processor(s) 1910 retrieves and executes the instructions. The instructions received by the working memory 1935 may optionally be stored on a non-transitory storage device 1925 either before or after execution by the processor(s) 1910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes one or more such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of training a neural network for performing visual odometry, the method comprising:
accessing, by the neural network implemented using one or more computer systems, a plurality of images of an environment;
determining, by the neural network based on the plurality of images, a plurality of three-dimensional points in the environment;
tracking, by the neural network, the plurality of three-dimensional points across the plurality of images;
selecting a subset of the three-dimensional points, wherein selecting the subset of the three-dimensional points comprises, for each of the three-dimensional points:
determining a stability metric of the three-dimensional point based on (i) a number of images of the plurality of images that depict the three-dimensional point, and (ii) a re-projection error associated with the three-dimensional point, and
determining whether to select the three-dimensional point based on the stability metric; and
modifying the neural network based on the subset of the three-dimensional points,
wherein selecting the subset of the three-dimensional points comprises, for each of the three-dimensional points:
classifying, based on the stability metric, the three-dimensional point as one of:
a first classification representing stable points,
a second classification representing unstable points, or
a third classification other than the first classification and the second classification,
wherein classifying the three-dimensional point as the first classification comprises:
determining that the three-dimensional point is depicted in a number of images of the plurality of images that is greater than or equal to a threshold number, and
determining that the re-projection error associated with the three-dimensional point is less than or equal to a first threshold error level, and
wherein classifying the three-dimensional point as the second classification comprises:
determining that the three-dimensional point is depicted in a number of images of the plurality of images that is greater than or equal to the threshold number, and
determining that the re-projection error associated with the three-dimensional point is greater than or equal to a second threshold error level, wherein the second threshold error level is different from the first threshold error level.

2. The method of claim 1, wherein selecting the subset of the three-dimensional points comprises:
selecting the three-dimensional points having the first classification or the second classification.

3. The method of claim 2, wherein selecting the subset of the three-dimensional points comprises:
refraining from selecting the three-dimensional points of the plurality of three-dimensional points having the third classification.

4. The method of claim 1, wherein classifying the three-dimensional point as the third classification comprises at least one of:
determining that the three-dimensional point is depicted in a number of images of the plurality of images that is less than the threshold number, or
determining that the re-projection error associated with three-dimensional point is between the first threshold error level and the second threshold error level.

5. The method of claim 1, wherein the plurality of images comprise two-dimensional images extracted from a video sequence.

6. The method of claim 5, wherein the plurality of images correspond to non-contiguous frames of the video sequence.

7. The method of claim 1, further comprising:
subsequent to modifying the neural network, receiving, by the neural network, a second plurality of images of a second environment from a head-mounted display device; and determining, by the neural network based on the second plurality of images, a second plurality of three-dimensional points in the second environment.

8. The method of claim 7, wherein performing visual odometry with respect to the second environment comprises determining a position and orientation of the head-mounted display device using the second plurality of three-dimensional points as landmarks.

9. A system comprising:

one or more processors;

one or more non-transitory computer-readable media including one or more sequences of instructions which, when executed by the one or more processors, causes the one or more processors to perform operations comprising:

accessing, by a neural network, a plurality of images of an environment;

determining, by the neural network based on the plurality of images, a plurality of three-dimensional points in the environment;

tracking, by the neural network, the plurality of three-dimensional points across the plurality of images;

selecting a subset of the three-dimensional points, wherein selecting the subset of the three-dimensional points comprises, for each of the three-dimensional points:

determining a stability metric of the three-dimensional point based on (i) a number of images of the plurality of images that depict the three-dimensional point, and (ii) a re-projection error associated with the three-dimensional point, and determining whether to select the three-dimensional point based on the stability metric; and modifying the neural network based on the subset of the three-dimensional points, wherein selecting the subset of the three-dimensional points comprises, for each of the three-dimensional points:

classifying, based on the stability metric, the three-dimensional point as one of:

a first classification representing stable points, a second classification representing unstable points, or a third classification other than the first classification and the second classification, wherein classifying the three-dimensional point as the first classification comprises:

determining that the three-dimensional point is depicted in a number of images of the plurality of images that is greater than or equal to a threshold number, and determining that the re-projection error associated with the three-dimensional point is less than or equal to a first threshold error level, wherein classifying the three-dimensional point as the second classification comprises:

determining that the three-dimensional point is depicted in a number of images of the plurality of images that is greater than or equal to the threshold number, and determining that the re-projection error associated with the three-dimensional point is greater than or equal to a second threshold error level, wherein the second threshold error level is different from the first threshold error level.

10. The system of claim 9, wherein selecting the subset of the three-dimensional points comprises:

selecting the three-dimensional points having the first classification or the second classification.

11. The system of claim 10, wherein selecting the subset of the three-dimensional points comprises:

refraining from selecting the three-dimensional points of the plurality of three-dimensional points having the third classification.

12. The system of claim 9, wherein classifying the three-dimensional point as the third classification comprises at least one of:

determining that the three-dimensional point is depicted in a number of images of the plurality of images that is less than the threshold number, or determining that the re-projection error associated with three-dimensional point is between the first threshold error level and the second threshold error level.

13. The system of claim 9, further comprising:

subsequent to modifying the neural network, receiving, by the neural network, a second plurality of images of a second environment from a head-mounted display device; and determining, by the neural network based on the second plurality of images, a second plurality of three-dimensional points in the second environment.

14. One or more non-transitory computer-readable media including one or more sequences of instructions which, when executed by one or more processors, causes the one or more processors to perform operations comprising:

accessing, by a neural network, a plurality of images of an environment;

determining, by the neural network based on the plurality of images, a plurality of three-dimensional points in the environment;

tracking, by the neural network, the plurality of three-dimensional points across the plurality of images;

selecting a subset of the three-dimensional points, wherein selecting the subset of the three-dimensional points comprises, for each of the three-dimensional points:

determining a stability metric of the three-dimensional point based on (i) a number of images of the plurality of images that depict the three-dimensional point, and (ii) a re-projection error associated with the three-dimensional point, and determining whether to select the three-dimensional point based on the stability metric; and modifying the neural network based on the subset of the three-dimensional points, wherein selecting the subset of the three-dimensional points comprises, for each of the three-dimensional points:

classifying, based on the stability metric, the three-dimensional point as one of:

a first classification representing stable points, a second classification representing unstable points, or a third classification other than the first classification and the second classification, wherein classifying the three-dimensional point as the first classification comprises:

determining that the three-dimensional point is depicted in a number of images of the plurality of images that is greater than or equal to a threshold number, and determining that the re-projection error associated with the three-dimensional point is less than or equal to a first threshold error level, and wherein classifying the three-dimensional point as the second classification comprises:

determining that the three-dimensional point is depicted in a number of images of the plurality of images that is greater than or equal to the threshold number, and determining that the re-projection error associated with the three-dimensional point is greater than or equal to a second threshold error level, wherein the second threshold error level is different from the first threshold error level.

\* \* \* \* \*